(12) United States Patent
Lin et al.

(10) Patent No.: US 11,096,176 B2
(45) Date of Patent: Aug. 17, 2021

(54) LOCATION-BASED BEAM PREDICTION USING MACHINE LEARNING

(71) Applicants: Yicheng Lin, Ottawa (CA); Mohammadhadi Baligh, Ottawa (CA); Hamidreza Farmanbar, Ottawa (CA); Aman Jassal, Kanata (CA)

(72) Inventors: Yicheng Lin, Ottawa (CA); Mohammadhadi Baligh, Ottawa (CA); Hamidreza Farmanbar, Ottawa (CA); Aman Jassal, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 16/422,383

(22) Filed: May 24, 2019

(65) Prior Publication Data
US 2020/0374863 A1 Nov. 26, 2020

(51) Int. Cl.
*H04W 4/00* (2018.01)
*H04W 72/04* (2009.01)
(Continued)

(52) U.S. Cl.
CPC ........ *H04W 72/048* (2013.01); *G06K 9/6256* (2013.01); *G06N 20/00* (2019.01); *H04L 41/16* (2013.01); *H04W 72/046* (2013.01)

(58) Field of Classification Search
None
See application file for complete search history.

(56) References Cited

U.S. PATENT DOCUMENTS

2016/0255604 A1* 9/2016 Venkatraman ........ H04W 64/00 455/456.1
2018/0218407 A1* 8/2018 He .......................... G06N 20/20
(Continued)

FOREIGN PATENT DOCUMENTS

CN 106416090 A 2/2017
CN 106605376 A 4/2017
(Continued)

OTHER PUBLICATIONS

Chen, Li et al., "Multi-stage beamforming codebook for 60GHz WPAN", 2011 6th International ICST Conference on Communications and Networking in China (CHINACOM), 2011, pp. 361-365.
(Continued)

*Primary Examiner* — Phirin Sam

(57) ABSTRACT

Network equipment receives, from User Equipment (UE), information indicative of each of multiple UE locations in a wireless communication network. For each location, a respective antenna beam direction for communications between the network equipment and a UE at each location is determined. A Machine Learning (ML) module is trained using each location as an ML module input and the respective antenna beam direction for each location as an ML module output. The trained ML module is then used to provide beam predictions based on UE location. Based on the current location of a UE, one or more antenna beam directions for communications between the network equipment and the UE at the current location are obtained from the ML module. The UE location is input to the ML module, and the antenna beam direction(s) are then obtained from the ML module output(s).

19 Claims, 14 Drawing Sheets

(51) Int. Cl.
*H04L 12/24* (2006.01)
*G06N 20/00* (2019.01)
*G06K 9/62* (2006.01)

(56) References Cited

U.S. PATENT DOCUMENTS

| | | | |
|---|---|---|---|
| 2019/0086988 A1* | 3/2019 | He | G06F 1/3212 |
| 2019/0097712 A1* | 3/2019 | Singh | H04B 7/04 |
| 2019/0268779 A1* | 8/2019 | Peroulas | H04W 16/22 |
| 2019/0340419 A1* | 11/2019 | Milman | G06T 15/02 |
| 2020/0053591 A1* | 2/2020 | Prasad | G06N 3/0445 |
| 2020/0160712 A1* | 5/2020 | Beaurepaire | G08G 1/143 |
| 2020/0314821 A1* | 10/2020 | Tofighbakhsh | H04B 7/0617 |

FOREIGN PATENT DOCUMENTS

| | | |
|---|---|---|
| EP | 3373466 A1 | 9/2018 |
| WO | 2016200302 A1 | 12/2016 |
| WO | 2018155844 A1 | 8/2018 |

OTHER PUBLICATIONS

Hur, Sooyoung et al., "Multilevel Millimeter Wave Beamforming for Wireless Backhaul", The Second Globecom 2011 Workshop on Femtocell Networks, 2011, pp. 253-257.

Guo, Hao et al., "Genetic Algorithm-Based Beam Refinement for Initial Access in Millimeter Wave Mobile Networks", Hindawi Wireless Communications and Mobile Computing, 2018, pp. 1-11.

Myers, Nitin et al., "Spatial Zadoff-Chu modulation for rapid beam alignment in mmWave phased arrays", Globecom Workshop, 2018, pp. 1-6.

* cited by examiner

LOCATION-BASED BEAM PREDICTION USING MACHINE LEARNING

FIELD

This application relates to wireless communications, and in particular to enabling location-based beam prediction using Machine Learning (ML).

BACKGROUND

Millimeter-wavelength ("mmWave") frequency bands represent one possible solution for providing high date rates in future generations of wireless communication systems, by exploiting the availability of many gigahertz of underutilized spectrum and an interference reduction or avoidance effect of the Line-Of-Sight (LOS) nature of mmWave communications. However, mmWave communications require large directional antenna beam gain in order to combat higher attenuation, including significant path loss, reflection loss, rain loss and other losses, relative to communications at lower frequencies.

One challenge associated with mmWave communications is that network equipment, such as Base Stations (BSs) and User Equipment (UEs), need to establish communications via highly directional antenna beams. In an initial access stage, an omnidirectional beam search procedure involves a BS and a UE performing beam scanning to identify beam directions for initial communication. After initial access, the BS and UE may perform a beam refinement procedure to adjust beam directions as the communication environment changes, due to the UE moving or the appearance of obstacles between the BS and the UE, for example. Initial beam searching and beam refinement can have significant overhead in terms of occupying time/frequency resources, especially when the number of Radio Frequency (RF) chains at a UE is limited. For example, for Time Division Multiplexing (TDM) based beam searching and only one RF chain at a UE, only one transmit/receive beam pair can be tested per time slot during beam searching and therefore multiple time slots are needed to test different transmit/receive beam pairs.

Communications via directional antenna beams typically involve an antenna array and beamforming. Beamforming for mmWave communications is different from conventional lower-frequency beamforming because it is more difficult to acquire Channel State Information (CSI) for mmWave communications. Codebook-based beamforming is therefore typically used for mmWave beamforming. Techniques for mmWave beamforming based on a codebook include TDM beam searching as referenced above or Frequency Division Multiplexing (FDM) beam searching. In TDM or FDM beam searching, different beam angles are exhaustively searched in order to find an optimal beam direction. Other solutions include: multi-stage/multi-level beamforming search (see, for example, [1] Multi-stage beamforming codebook for 60 GHz WPAN, 2011 6th International ICST Conference on Communications and Networking in China (CHINACOM), 2011 and [2] Multilevel Millimeter Wave Beamforming for Wireless Backhaul, The Second Globecom 2011 Workshop on Femtocell Networks, 2011), in which a coarse sector-wise beam search is followed by a finer narrow-beam search; genetic algorithm based beam refinement (see, for example, [3] Genetic Algorithm-Based Beam Refinement for Initial Access in Millimeter Wave Mobile Networks, Hindawi Wireless Communications and Mobile Computing, 2018), which requires fewer beam searches; and compressed sensing algorithm based beamforming (see, for example, [4] Spatial Zadoff-Chu modulation for rapid beam alignment in mmWave phased arrays, Globecom Workshop, 2018), which exploits the sparsity of mmWave channels to reduce the number of channel measurements.

Even with these beam searching techniques, beam searching-based mmWave beamforming still involves significant overhead. Therefore, there is a desire in the art to reduce the signaling overhead involved in beamforming, particularly in mmWave applications.

SUMMARY

Embodiments of the present disclosure propose new solutions for mmWave beamforming. The proposed solutions include a hybrid approach, which incorporates Machine Learning (ML) based techniques with mmWave beam searching.

One aspect of this disclosure relates to a method performed by network equipment in a wireless communication network. According to an embodiment, such a method involves receiving, from User Equipment (UE), information indicative of each location of a plurality of UE locations in the wireless communication network, and determining, for each location, a respective antenna beam direction for communications between the network equipment and a UE at each location. A Machine Learning (ML) module is trained using each location as an ML module input and the respective antenna beam direction for each location as an ML module output.

Network equipment for a wireless communication network includes at least one antenna, a processor coupled to the at least one antenna, and a processor-readable memory, coupled to the processor, and storing processor-executable instructions which, when executed by the processor, cause the processor to perform a method. The method is as described above in some embodiments, and involves receiving, from User Equipment (UE), information indicative of each location of a plurality of UE locations in the wireless communication network; determining, for each location, a respective antenna beam direction for communications between the network equipment and a UE at each location; and training an ML module using each location as an ML module input and the respective antenna beam direction for each location as an ML module output.

Such a processor-readable memory need not be implemented only in conjunction with other components of network equipment. For example, another embodiment relates to a processor-readable memory storing processor-executable instructions which, when executed by a processor in network equipment in a wireless communication network, cause the processor to perform a method that involves receiving, from User Equipment (UE), information indicative of each location of a plurality of UE locations in the wireless communication network; determining, for each location, a respective antenna beam direction for communications between the network equipment and a UE at each location; and training an ML module using each location as an ML module input and the respective antenna beam direction for each location as an ML module output.

The above embodiments include training an ML module. Other embodiments are also possible. For example, another method performed by network equipment in a wireless communication network involves receiving from a UE an indication of a current location of the UE in the wireless communication network, and obtaining, based on the current location of the UE as an input to an ML module that has been trained using each location of a plurality of UE locations in the wireless communication network as an ML module input and a respective antenna beam direction for communications between the network equipment and a UE at each location as an ML module output, an antenna beam direction for communications between the network equipment and the UE at the current location.

According to another embodiment, network equipment for a wireless communication network includes at least one antenna, a processor coupled to the at least one antenna; and a processor-readable memory, coupled to the processor, and storing processor-executable instructions which, when executed by the processor, cause the processor to perform such a method. In an embodiment, the method involves receiving from a UE an indication of a current location of the UE in the wireless communication network; and obtaining, based on the current location of the UE as an input to an ML module that has been trained using each location of a plurality of UE locations in the wireless communication network as an ML module input and a respective antenna beam direction for communications between the network equipment and a UE at each location as an ML module output, an antenna beam direction for communications between the network equipment and the UE at the current location.

A processor-readable memory storing such processor-executable instructions need not necessarily be implemented as part of network equipment. For example, another embodiment relates to a processor-readable memory storing processor-executable instructions which, when executed by a processor in network equipment in a wireless communication network, cause the processor to perform a method that involves receiving from a UE an indication of a current location of the UE in the wireless communication network; and obtaining, based on the current location of the UE as an input to an ML module that has been trained using each location of a plurality of UE locations in the wireless communication network as an ML module input and a respective antenna beam direction for communications between the network equipment and a UE at each location as an ML module output, an antenna beam direction for communications between the network equipment and the UE at the current location.

BRIEF DESCRIPTION OF THE DRAWINGS

Embodiments of the disclosure will now be described with reference to the attached drawings in which.

DETAILED DESCRIPTION

Figure 1:
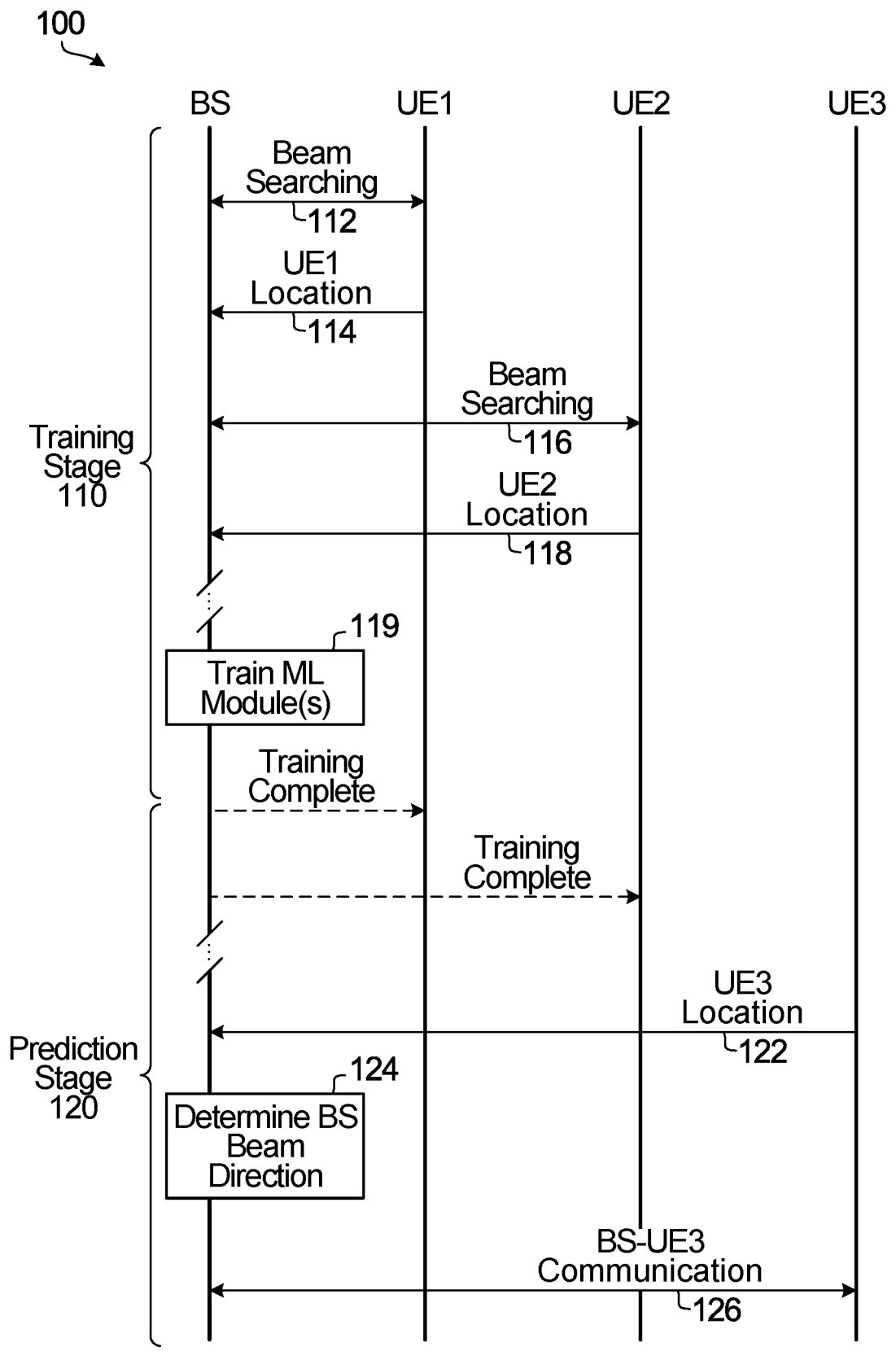
FIG. 1 is a signal flow diagram illustrating ML-assisted network-side antenna beam prediction according to an embodiment.

Machine Learning (ML) is an emerging and fast-growing field, as a result of advances in computer architecture such as General Purpose Graphics Processing Units (GP-GPUs). As an example, deep Convolutional Neural Networks have attracted attention because of their ability to find patterns in data with intrinsic structure through the use of convolutional filters. The application of ML to the field of communications is largely unexplored and may help outperform existing solutions and/or help reshape wireless networks conceptually. Throughout this disclosure, reference is made to ML modules as components or blocks based on an implementation of ML mechanisms. One example of an ML implementation is a neural network implemented in hardware, one or more components that execute software, or a combination thereof.

The present inventors have recognized that optimal beam direction, for mmWave directional beamforming for example, is UE location-specific. For downlink communications for example, the beam direction(s) from which a UE best receives signals (angle(s) of arrival) and the beam direction(s) in which a BS transmits to a particular UE (angle(s) of departure) depend on communication environment conditions, such as reflection and diffraction of signals, and are affected by UE location. For a single-path LOS scenario, BS and UE beam directions depend on the BS-UE wireless path or link orientation. For a more complicated multi-path scenario, in which there are both LOS and Non-Line-Of-Sight (NLOS) links, there are multiple available BS and UE beam directions depending on the environment. In both single-path and multi-path scenarios, however, multiple UEs at the same location have the same beam direction(s) for communications with the same BS.

With this motivation, the present disclosure proposes implementation of ML-assisted beam prediction, for application of ML to mmWave beamforming for example. Some embodiments employ supervised ML with neural networks. For example, one idea is to train a neural network with UE location/beam direction samples, such that the neural network learns BS/UE beam directions based directly on UE location. This type of ML application enables BS and UE beam directions to be determined based solely on UE location rather than performing beam searching each time a UE is to communicate with a BS.

In some embodiments, a hybrid approach involves both mmWave beam searching and ML based beamforming. An example is a two-stage procedure that includes a training stage and a prediction stage.

In the training stage, BS and/or UE beam directions for multiple UE locations in a wireless communication network are obtained through a beam searching procedure. TDM/FDM beam sweeping/tracking/refinement, a multi-stage/multi-level beamforming search, genetic based beam refinement, and compressed sensing based beamforming are examples of beam forming procedures that are suitable for collecting data samples during a training stage. The data samples include UE locations and corresponding optimal BS and/or UE beam directions.

In some embodiments, UE locations are specified using ordered sets of values according to a coordinate system, such as (x,y) or (x,y,z). Beam directions could be specified in any of various ways, including beamforming codebook indices for example. The present disclosure is not limited to any particular form of UE location information or beam direction information.

The BS trains an ML module, such as a neural network, at the BS side using the collected data samples. The number of data samples collected used to train the ML module is statically configured at the BS in some embodiments. Dynamic configuration of the number of data samples is also possible. Another option involves monitoring the ML module for convergence of an ML predictor that is being trained, and transitioning from the training stage to the prediction stage when a target degree of convergence is reached. Any of various types of cost functions, and/or other convergence testing techniques, could be applied to determine when an ML predictor has sufficiently converged.

Regardless of the specific measure or technique that is used to assess convergence and declare the end of the training stage, after training is complete the ML module is available for use in providing BS and/or UE beam predictions based on UE location.

At the prediction stage, the trained ML module at the BS is used to predict, directly from UE locations, BS and/or UE optimal beam directions.

Due to communication environment changes possibly affecting LOS and/or NLOS (reflection or diffraction) paths or links for example, ML module training is repeated in some embodiments. Training can be considered semi-static in such embodiments.

Beam directions need not necessarily be specified in terms of actual directions. For example, BS and/or UE beam directions are indicated using one or more beam or beamforming indices in some embodiments. UEs can have different orientations, and therefore it may be desirable to use "absolute" beam indices, corresponding to certain directions regardless of UE orientation, in the training and prediction stages. At a UE, absolute beam indices could be determined for reporting to a BS during training, and/or interpreted to enable beamforming at the UE for communications with a BS after receiving a prediction from the BS. In some embodiments, such absolute UE beam index determination and/or interpretation use a compass inside a UE and possibly additional internal UE-referenced beam indices for example. A quantized beam codebook is used in some embodiments to specify directions and/or associated absolute beam indices.

Network equipment such as a BS typically does not change orientation, and therefore it is not expected that beam index management will be an issue for such equipment. In the case of network equipment that changes orientation, beam index management as disclosed herein for UEs could also or instead be implemented at network equipment.

BSs are typically at different locations in a wireless communication network, and therefore beam directions for communications between any UE location and different BSs may be different. In some embodiments, different BSs train and maintain separate ML modules, and beam predictions from the ML module may be different, even if the predictions are for communications with the same UE. The same set of beam indices and the same beam index-direction associations could be used at different BSs, but the actual predictions at different BSs may be different because of different relative orientations between the BSs and a UE.

The ML-based approaches disclosed herein are applicable to both network-side and UE-side beam prediction. In some embodiments, one ML module is trained and used for BS-side beam prediction and another ML module is trained and used for UE-side beam prediction. Other embodiments involve training and using a single ML module for both BS-side beam prediction and UE-side beam prediction. For example, one possible option for implementing a single ML module for both BS-side beam prediction and UE-side beam prediction is a neural network having more outputs than neural networks that are suitable for use as separate ML modules for BS-side beam prediction and UE-side beam prediction.

Some embodiments disclosed herein relate to ML prediction of a BS beam direction and a UE beam direction for BS-UE communications, based on UE location. In other embodiments, ML prediction is used for either BS beam direction or UE beam direction. Not every embodiment necessarily involves both BS beam prediction and UE beam prediction for a BS-UE pair.

A predicted BS beam direction or UE beam direction could be for an LOS link or an NLOS link. In some embodiments, multiple BS-side ML predictions and/or multiple UE-side ML predictions are made. For example, an ML module could be used to predict more than one BS beam direction and/or more than one UE beam direction for a BS-UE pair based on one UE location in a multi-path scenario, for multiple LOS beams and/or NLOS beams or links. One reason to implement multiple-prediction capability is to handle a scenario in which a beam currently being used by a BS-UE pair, such as a predicted strongest beam, is blocked due to a sudden environment change. Multiple beam predictions enable the BS and UE to switch to an alternative beam without repeating a prediction procedure.

To predict a number N of BS or UE beam directions, for example, one possible option is to train N respective ML modules. Each ML module is trained for making one of the N beam predictions, using data samples collected for one of the N most reliable beam directions per UE location during training. In an alternative embodiment, one ML module is trained for all N beam predictions, again using data samples collected for the N most reliable beam directions per UE location during training. For the case of a single ML module, 1) the ML module outputs a probability of each possible beam being the $1^{st}$ beam, a probability of each possible beam being the $2^{nd}$ beam, . . . , and each beam with highest probability being the n-th ($1<=n<=N$) beam is selected; or 2) the ML module outputs a probability of each beam, then the N beams with N largest probability are selected. For option 1), supposing there are M beams in total, the single ML module has M*N outputs, including M outputs indicating probabilities for the M beams, for each of the N beam predictions. For option 2), the N beam probabilities provide a measure of "strength" of each beam; the larger the probability, the stronger the beam.

ML beam prediction based on UE location potentially reduces overhead associated with beam searching, in that beam searching is performed only for training and possibly re-training an ML module rather than every time beam directions are needed. ML training and prediction does, however, involve some signaling between BSs and UEs. For example, signaling from UEs to BSs includes: UE location information in training and prediction stages, for ML-based beam prediction for either or both of BS-side and UE-side beam directions; and optionally UE beam information such as a beam index in the training stage, for ML-based UE-side beam prediction.

For ML-based UE-side beam prediction, signaling from BSs to UEs includes predicted UE beam information, such as UE beam index, in the prediction stage.

In these signaling examples, and others herein, UE beam information such as UE beam index could be explicitly signaled, or implicitly signaled via an association with other communication resources in which the beam information is transmitted for example.

In some embodiments, BS to UE signaling also includes signaling for mode or stage switching, from training stage to prediction stage. Such signaling provides UEs with an indication that training is complete, and therefore no further beam searching is needed.

Another example of BS to UE signaling is signaling for optional additional beam refinement, which is performed during the prediction stage in some embodiments as described elsewhere herein.

UE location information is signaled to the BS in both the training stage and the prediction stage. There are ways to reduce UE location signaling overhead. For example, UE location information signaled to a BS can be of an incremental value instead of absolute value. UE location is expected to change continuously, rather than discontinuously with significant changes between locations, at least while a UE is actively in use. An example of an incremental value for signaling UE location is a quantized offset indicating a new UE location relative to a previous location. Distance from a previous location could be signaled, for example, as n*D units distance from the previous location, where n is the number of quantized distance units, and D is the quantized direction, such as East, West, North, or South. Multiple increments could be signaled, for example if the UE moves Northwest from its previous location. Sending one or more quantized incremental values may reduce location information overhead compared to sending absolute location information every time a UE is moved.

In some embodiments, UE movement history is also or instead used to predict future location so that UE to BS signaling can be reduced.

A potential benefit of ML-assisted beam prediction is reduction in time/frequency overhead incurred by beam sweeping/tracking/refinement, or other conventional beam searching or beamforming schemes. ML training is done offline, only once or only semi-statically, and online prediction during the prediction state using a trained ML module is quite efficient relative to repeating beam searching every time a beam is needed.

Several illustrative example embodiments are described in further detail below.

In a first embodiment, the training stage and prediction stage are for BS-side beam prediction for communications with a certain UE. FIG. 1 is a signal flow diagram illustrating ML-assisted beam prediction according to the first embodiment.

In the signal flow diagram 100, a BS and two UEs, including UE1 and UE2, are involved in a training stage 110. A beam searching procedure between the BS and UE1 is shown at 112, and a beam searching procedure between the BS and UE2 is shown at 116. In these beam searching procedures 112, 116, the BS determines the respective BS-side optimal beam direction for communications with UE1 and UE2 at the current locations of those UEs. Each of UE1 and UE2 feeds back to the BS, at 114, 118, an indication of current UE location corresponding to the beam searching results.

The BS gathers data samples, including <BS beam direction, UE location>, by determining a respective optimal BS beam direction for each UE location and receiving an indication of the UE location to which the optimal BS beam direction corresponds. Two UEs are shown in FIG. 1, and each UE participates in one beam searching procedure and reports one UE location to the BS. In other embodiments, many more UEs are involved in beam searching and location reporting, and each UE may move and participate in multiple beam searching procedures and report multiple UE locations to the BS.

The collected data samples are used by the BS at 119 to train one or more ML module(s) for BS beam prediction. Data sample collection need not be entirely completed before training begins. For example, data samples could be used for ML module training as those data samples are collected.

In some embodiments, completion of the training stage is signaled from the BS to the participating UEs, UE1 and UE2.

In FIG. 1, the BS uses the trained ML module(s) in the prediction stage 120 to predict BS beam direction(s) for communications with another UE, UE3. Different UEs need not necessarily be involved in training and prediction as shown in FIG. 1. UEs that are involved in the training stage 110 could also be involved in the prediction stage 120.

UE3 transmits an indication of its current location to the BS as shown at 122. At 124, the BS determines the optimal BS beam direction (or multiple beam directions) for communications with UE3, by inputting the UE3 location into the trained ML module(s) to obtain the BS beam direction(s) at the output(s) of the ML module(s). BS-UE3 communications then proceed at 126, using beamforming to orient a BS beam in a determined BS beam direction for example.

Although not shown in FIG. 1, in some embodiments the BS and UE3 perform BS-side beam refinement around the predicted beam direction(s).

UE behaviors in FIG. 1 include UE1, UE2 transmitting indications of their locations to the BS at 114, 118 in the training stage 110 and UE3 transmitting an indication of its location to the BS at 122 in the prediction stage 120. The UE location indications are transmitted to the BS at 114, 118 to assist the BS in ML module training at 119, and the UE3 location indication is transmitted to the BS at 122 to assist the BS in prediction of the BS beam direction(s) at 124 for communications with UE3.

In the embodiment shown in FIG. 1, the BS beam direction is directly determined at 124 in the prediction stage 120 based on the location of UE3, without the overhead of another beam search.

Figure 2:
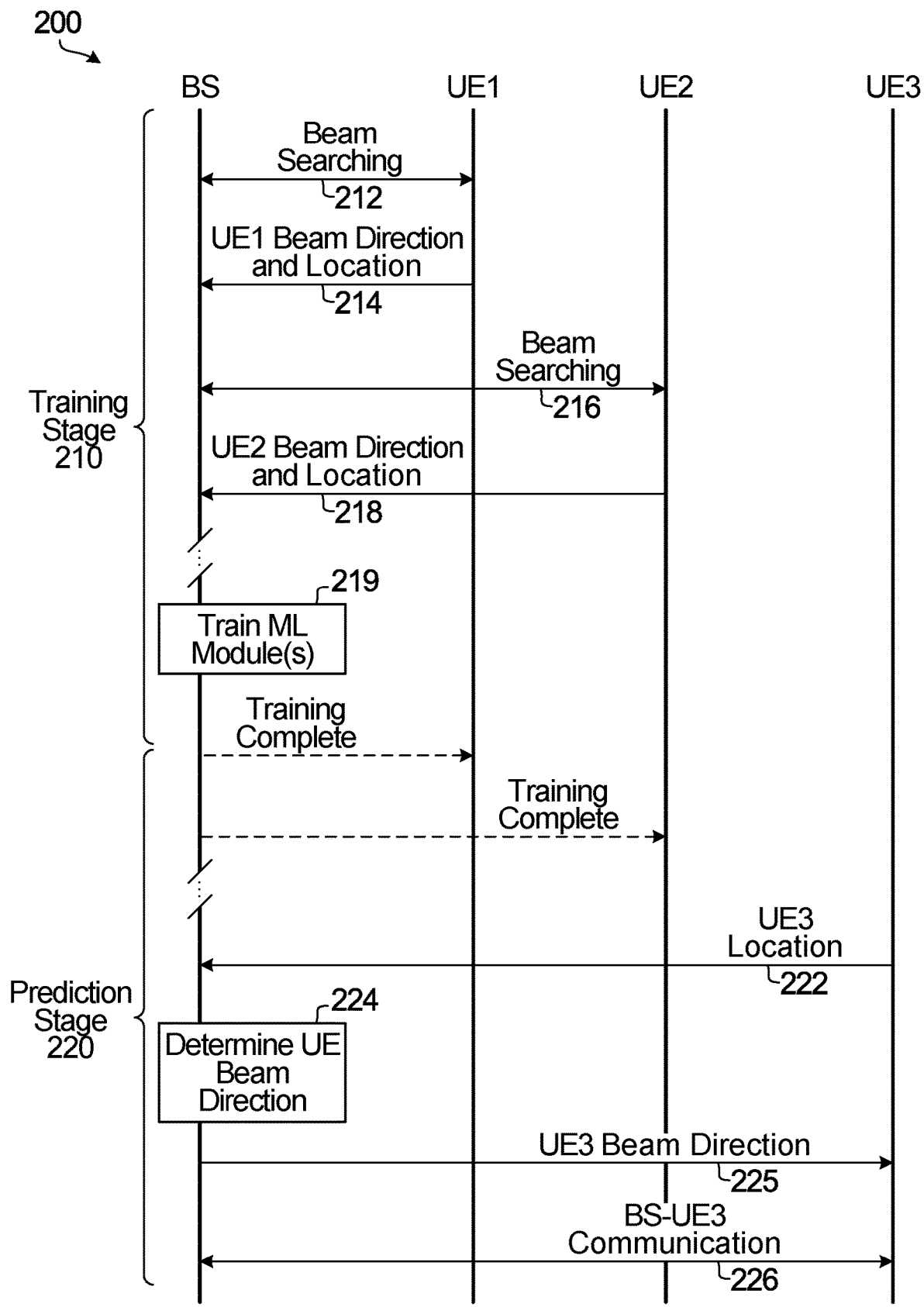
FIG. 2 is a signal flow diagram illustrating ML-assisted UE-side antenna beam prediction according to another embodiment.

In a second embodiment, the training stage and prediction stage are for UE-side beam prediction. FIG. 2 is a signal flow diagram illustrating ML-assisted UE-side beam prediction according to the second embodiment.

The signal flow diagram 200, like the signal flow diagram 100 in FIG. 1, illustrates a BS and three UEs. The BS and UEs UE1 and UE2 are involved in a training stage 210. A beam searching procedure between the BS and UE1 is shown at 212, and a beam searching procedure between BS and UE2 is shown at 216. In these beam searching procedures 212, 216, each of the UEs UE1 and UE2 determines a respective UE-side optimal beam direction for communications with the BS from the current location of each of those UEs. Each of UE1 and UE2 feeds back to the BS, at 214, 218, indications UE beam direction and current UE location corresponding to the UE beam directions determined during beam searching. Although FIG. 2 shows one transmission from each of UE1 and UE2 to the BS at 214, 218, a UE transmits UE beam direction and UE location to the BS in separate transmissions in other embodiments.

During the training stage 210, the BS gathers data samples, including <UE beam direction, UE location>, for multiple UE locations. Two UEs are shown in FIG. 2, and each UE participates in one beam searching procedure and reports one UE beam direction and one UE location to the BS. In other embodiments, many more UEs are involved in beam searching and beam direction/location reporting, and each UE may move and participate in multiple beam searching procedures and report multiple UE beam directions and locations to the BS.

The collected data samples are used by the BS at 219 to train one or more ML module(s) for UE beam prediction. Data sample collection need not be entirely completed before training begins. For example, data samples could be used for ML module training as those data samples are collected.

In some embodiments, completion of the training stage is signaled from the BS to the participating UEs, UE1 and UE2.

In FIG. 2, the BS uses the trained ML module(s) in the prediction stage 220 to predict UE beam direction(s) for communications with another UE, UE3. Different UEs need not necessarily be involved in training and prediction as shown in FIG. 2. UEs that are involved in the training stage 210 could also be involved in the prediction stage 220.

UE3 transmits an indication of its current location to the BS as shown at 222. At 224, the BS determines the optimal UE beam direction (or multiple beam directions) for communications with UE3, by inputting the UE3 location into the trained ML module(s) to obtain the UE3 beam direction(s) at the output(s) of the ML module(s), and transmits an indication of the UE3 beam direction(s) to UE3 at 225. BS-UE3 communications then proceed at 226, using a determined UE3 beam direction.

Although not shown in FIG. 2, in some embodiments the BS and UE3 perform UE-side beam refinement around the predicted beam direction(s).

UE behaviors in FIG. 2 include UE1, UE2 transmitting indications of their beam searching results and locations to the BS at 214, 218 in the training stage 210, and UE3 transmitting an indication of its location to the BS at 222 in the prediction stage 220. The UE beam direction and location indications are transmitted to the BS at 214, 218 to assist the BS in ML module training at 219, and the UE3 location indication is transmitted to the BS at 222 to assist the BS in prediction of the UE beam direction(s) for communications with UE3.

In the embodiment shown in FIG. 2, UE beam direction is directly determined in the prediction stage 220 based on the location of UE3, without the overhead of another beam search.

Figure 3:
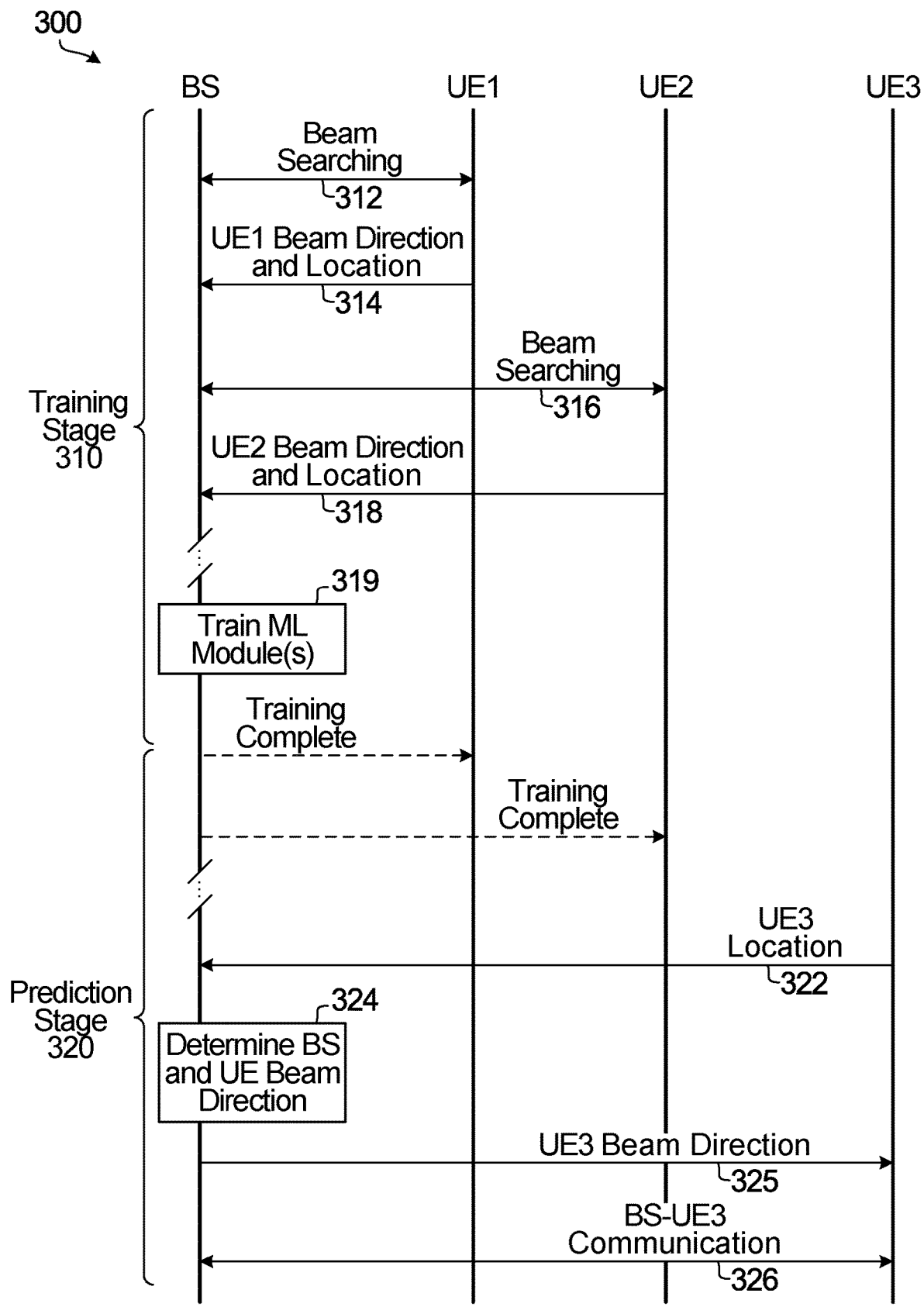
FIG. 3 is a signal flow diagram illustrating ML-assisted network-side and UE-side antenna beam prediction according to yet another embodiment.

According to a third embodiment, the training stage and prediction stage are for both BS-side and UE-side beam prediction based on ML. FIG. 3 is a signal flow diagram illustrating ML-assisted beam prediction according to the third embodiment.

In the third embodiment illustrated in FIG. 3, the beam searching and reporting at 312, 314 and 316, 318 in the training stage 310 are the same as in the training stage 210 in FIG. 2, with each of UEs UE1 and UE2 participating in a beam searching procedure and feeding back indications of UE beam direction and current UE location to the BS. The BS gathers data samples, including <UE beam direction, BS beam direction, UE location>, for multiple UE locations. The BS beam direction entries for the data samples are determined by the BS during the beam searching procedures 312, 316. The data samples are used by the BS at 319 to train one or ML module(s) for BS and UE beam direction prediction. ML module training options include, for example, training a single ML module for both BS beam prediction and UE beam prediction, and training multiple ML modules including a first ML module for BS beam prediction and a second ML module for UE beam prediction.

The ML module(s) trained at 319 are used by the BS in the prediction stage 320 to predict BS beam direction and UE beam direction for communications with UE3, based on the current location of UE3. An indication of the current UE3 location is transmitted to the BS by UE3 and received by the BS from UE3 at 322. The BS inputs the UE3 location into the trained ML module(s) to obtain one or more BS beam direction(s) and one or more UE beam direction(s) at 324, and transmits an indication of the UE3 beam direction(s) to UE3 at 325. BS-UE3 communications then proceed at 326, using a determined BS beam direction and a corresponding UE3 beam direction.

Variations described above with reference to FIG. 1 and/or FIG. 2 also apply to the third embodiment illustrated in FIG. 3.

UE behaviors in FIG. 3 are the same as in FIG. 2. The UE beam direction and location indications are transmitted to the BS at 314, 318 to assist the BS in ML module training at 319, and the UE3 location indication is transmitted to the BS at 322 to assist the BS in prediction of both UE beam direction(s) and UE beam direction(s) for communications with UE3.

The third embodiment shown in FIG. 3 enables both BS and UE beam directions to be directly determined in the prediction stage 320 based on the location of UE3, without the overhead of another beam search.

Figure 4:
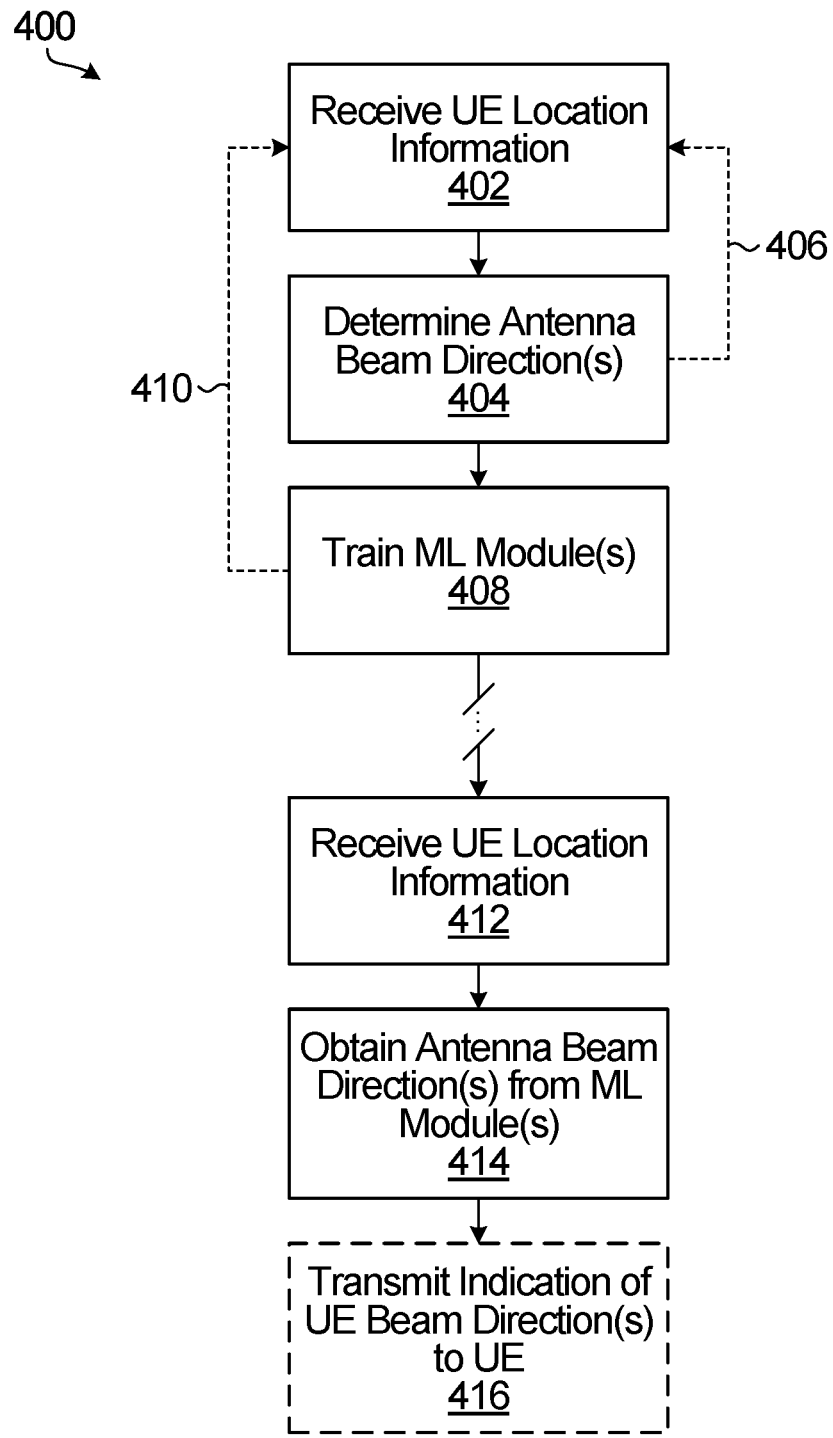
FIG. 4 is a flow chart illustrating an example of a method performed by network equipment.

FIG. 4 is a flow chart illustrating an example of a method performed by network equipment.

The example method 400 is illustrative of a method performed by network equipment in a wireless communication network, and is also consistent with the signal flow examples shown in FIGS. 1 to 3. At 402, UE location information that is indicative of each of multiple UE locations in the wireless communication network is received from one or more UEs, such as UE1 and UE2 in FIGS. 1 to 3. Various options for signaling location information at 402 are disclosed elsewhere herein.

For each location, a respective antenna beam direction for communications between the network equipment and a UE at each of the locations is determined at 404. The dashed arrow 406 in FIG. 4 is intended to illustrate that UE location information is received, and beam direction determinations are made, for each of multiple UE locations.

The beam direction(s) determined at 404 for each UE location include one or both of a respective network equipment antenna beam direction and a respective UE antenna beam direction. In some embodiments, determination of UE antenna beam directions by network equipment at 404 involves receiving a respective indication of the UE antenna beam direction for each location from a UE that is positioned at each location. A respective network equipment antenna beam for each location is determined at 404 in some embodiments based on beam scanning between the network equipment and a UE that is positioned at each location.

At 408, one or more ML modules are trained, using each location as an ML module input and the respective antenna beam direction for each location as an ML module output. The dashed arrow at 410 is intended to represent optional re-training, which may be implemented in some embodiments. In re-training, the receiving at 402, the determining at 404, and the training at 408 are repeated.

In some embodiments that involve determining a respective network equipment antenna beam direction and a respective UE antenna beam direction for each location, the ML module includes multiple ML modules, such as a first ML module and a second ML module, for example. The training could then involve training the first ML module using the UE locations as inputs and the respective network equipment antenna beam direction for each location as outputs, and training the second ML module using the UE locations as inputs and the respective UE antenna beam direction for each location as outputs.

For multi-path scenarios, the determining at 404 involves determining, for each location, a respective set of multiple antenna beam directions for multi-path communications between the network equipment and a UE at each location, and the training at 408 involves training the ML module using the plurality of locations as inputs and the respective sets of multiple antenna beam directions for each location as outputs.

Multiple ML modules are used in some multi-path embodiments. One example involves implementing a respective ML module to provide beam predictions for each path. In another embodiment, the determining at 404 involves determining, for each location, a respective set of multiple network equipment antenna beam directions and a respective set of multiple UE antenna beam directions, and the ML module includes a first ML module for network equipment beam predictions and a second ML module for UE beam predictions. In this case, the training involves training the first ML module using the plurality of locations as inputs and the respective sets of multiple network equipment antenna beam directions for each location as outputs, and training the second ML module using the plurality of locations as inputs and the respective sets of multiple UE antenna beam directions for each location as outputs.

The operations at 402, 404, 408 are illustrative of a training stage in which collected UE location and beam direction data samples are used to train one or more ML modules. A prediction stage of a network equipment method involves receiving from a UE an indication of a current location of the UE in the wireless communication network. This is shown at 412 in FIG. 4. Various options for signaling location information at 412 are disclosed elsewhere herein.

A broken line is shown between 408 and 412, to illustrate that beam prediction need not necessarily be immediately preceded by training. For example, there could be a time lapse between the completion of training, which is performed offline in some embodiments, and receipt of UE location information at 412 for beam prediction.

Based on the current location of the UE, one or more antenna beam directions for communications between the network equipment and the UE at the current location are obtained from the ML module at 414. The UE location is input to the ML module, and the antenna beam direction(s) are then obtained from the ML module output(s). The ML module has been trained as disclosed herein, using each location of a plurality of UE locations in the wireless communication network as an ML module input and a respective antenna beam direction for communications between the network equipment and a UE at each location as an ML module output.

In some embodiments, a UE antenna beam direction for communications between the network equipment and the UE at the current location is obtained at 414, and an indication of the UE antenna beam direction obtained from the ML module is transmitted to the UE at 416. The transmitting at 416 is optional. For example, in some embodiments the obtaining at 414 involves obtaining only a network equipment antenna beam direction for communications between the network equipment and the UE at the current location, and network equipment antenna beam direction need not be signaled to the UE. In other embodiments, both a network equipment antenna beam direction and a UE antenna beam direction are obtained at 414, and an indication of the UE beam direction is transmitted to the UE at 416.

The example method 400 is representative of one embodiment. Other embodiments may include fewer, additional, and/or different operations, performed in a similar or different order. For example, operations 404 and 402 could be reversed in some embodiments, and UE location could be received after one or more antenna beam directions have been determined. Other variations, including various ways to perform one or more method operations based on descriptions of system or apparatus features herein for example, may be or become apparent.

A method variation that focuses on beam prediction using a trained ML module, for example, involves receiving from a UE an indication of a current location of the UE in the wireless communication network, as shown at 412, and using the current location of the UE as an input to obtain from an ML module at 414 an antenna beam direction for communications between the network equipment and the UE at the current location. In this example, the ML module has been trained as disclosed herein, using each of multiple UE locations in the wireless communication network as an ML module input and a respective antenna beam direction for communications between the network equipment and a UE at each location as an ML module output.

In some embodiments that involve obtaining a network equipment antenna beam direction and a UE antenna beam direction, the ML module includes multiple ML modules, such as a first ML module and a second ML module, for example. The obtaining could then involve obtaining the network equipment antenna beam direction from the first ML module, and obtaining the UE antenna beam direction from the second ML module.

For multi-path scenarios, the obtaining at 414 involves obtaining a set of multiple antenna beam directions for multi-path communications between the network equipment and the UE at the current location.

Multiple ML modules are used in some multi-path embodiments. One example involves implementing a respective ML module to provide beam predictions for each path. In another embodiment, the obtaining at 414 involves obtaining a set of multiple network equipment antenna beam directions and a set of multiple UE antenna beam directions, and the ML module includes a first ML module for network equipment beam predictions and a second ML module for UE beam predictions. In this case, the obtaining involves obtaining the set of multiple network equipment antenna beam directions from the first ML module, and obtaining the set of multiple UE antenna beam directions from the second ML module.

Various embodiments are disclosed by way of example above. More detailed illustrative examples and observations are also provided below.

Figure 5:
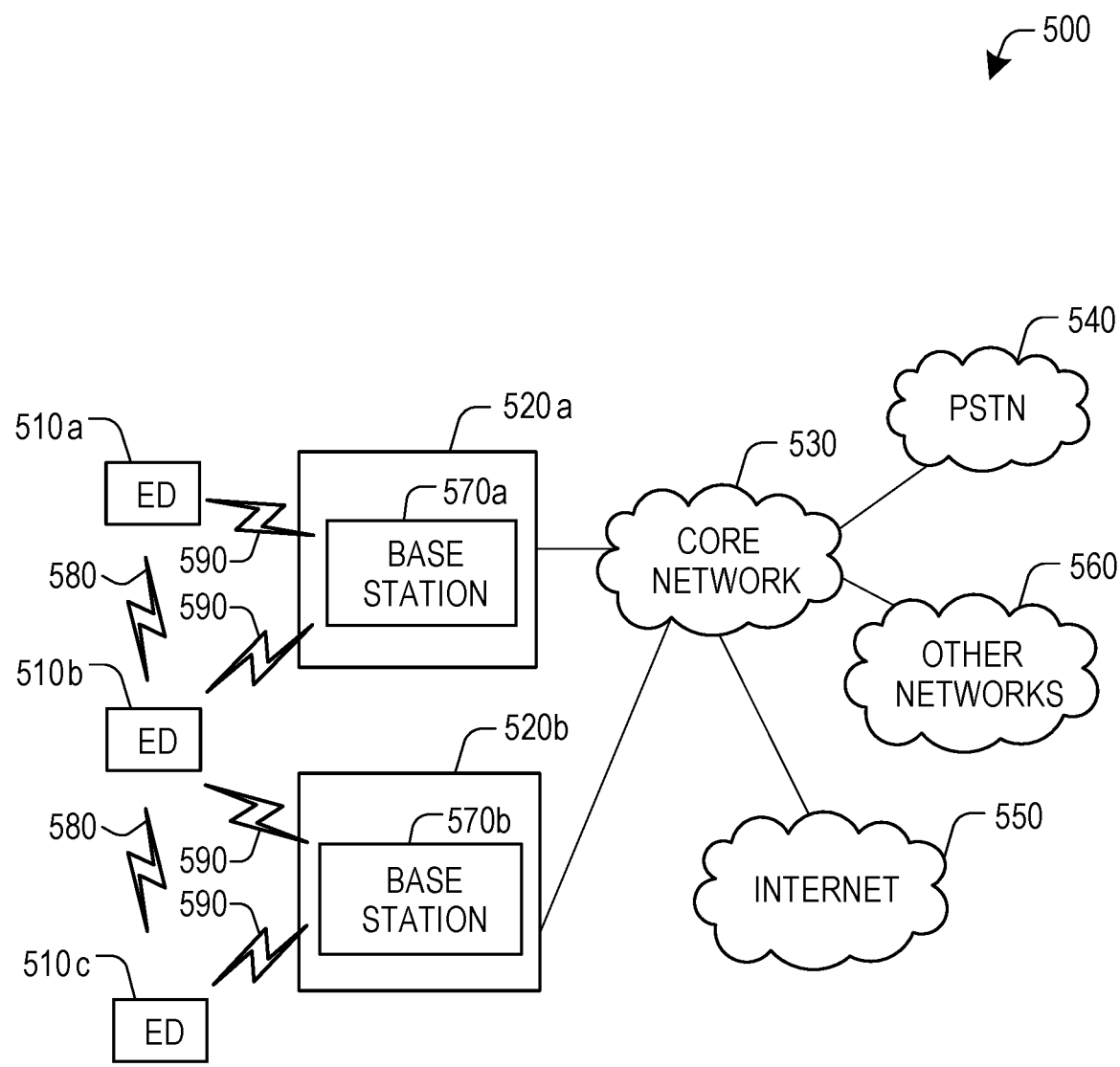
FIG. 5 is a block diagram of a communication system.

FIG. 5 illustrates an example communication system 500 in which embodiments of the present disclosure could be implemented. In general, the communication system 500 enables multiple wireless or wired elements to communicate data and other content. The purpose of the communication system 500 may be to provide content (voice, data, video, text) via broadcast, narrowcast, user device to user device, etc. The communication system 500 may operate by sharing resources such as bandwidth.

In this example, the communication system 500 includes electronic devices (ED) 510a-510c, radio access networks (RANs) 520a-520b, a core network 530, a public switched telephone network (PSTN) 540, the internet 550, and other networks 560. Although certain numbers of these components or elements are shown in FIG. 5, any reasonable number of these components or elements may be included in the communication system 500.

The EDs 510a-510c are configured to operate, communicate, or both, in the communication system 500. For example, the EDs 510a-10c are configured to transmit, receive, or both via wireless or wired communication channels. Each ED 510a-510c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 5, the RANs 520a-520b include base stations 570a-570b, respectively. Each base station 570a-470b is configured to wirelessly interface with one or more of the EDs 510a-510c to enable access to any other base station 570a-570b, the core network 530, the PSTN 540, the internet 550, and/or the other networks 560. For example, the base stations 570a-570b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 510a-510c may be alternatively or additionally configured to interface, access, or communicate with any other base station 570a-570b, the internet 550, the core network 530, the PSTN 540, the other networks 560, or any combination of the preceding. The communication system 500 may include RANs wherein the corresponding base station accesses the core network 530 via the internet 550.

The EDs 510a-510c and base stations 570a-570b are examples of communication equipment that can be configured to implement some or all of the functionality and/or embodiments described herein. In the embodiment shown in FIG. 5, the base station 570a forms part of the RAN 520a, which may include other base stations, base station controller(s) (BSC), radio network controller(s) (RNC), relay nodes, elements, and/or devices. Any base station 570a, 570b may be a single element, as shown, or multiple elements, distributed in the corresponding RAN, or otherwise. Also, the base station 570b forms part of the RAN 520b, which may include other base stations, elements, and/or devices. Each base station 570a-570b transmits and/or receives wireless signals within a particular geographic region or area, sometimes referred to as a "cell" or "coverage area". A cell may be further divided into cell sectors, and a base station 570a-570b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RANs 520a-520b shown is an example only. Any number of RANs may be contemplated when devising the communication system 500.

The base stations 570a-570b communicate with one or more of the EDs 510a-510c over one or more air interfaces 590 using wireless communication links e.g. radio frequency (RF), microwave, infrared (IR), etc. The air interfaces 590 may utilize any suitable radio access technology. For example, the communication system 500 may implement one or more channel access methods, such as code division multiple access (CDMA), time division multiple access (TDMA), frequency division multiple access (FDMA), orthogonal frequency division multiple access (OFDMA), or single-carrier FDMA (SC-FDMA) in the air interfaces 590.

A base station 570a-570b may implement Universal Mobile Telecommunication System (UMTS) Terrestrial Radio Access (UTRA) to establish an air interface 590 using wideband CDMA (WCDMA). In doing so, the base station 570a-570b may implement protocols such as HSPA, HSPA+ optionally including HSDPA, HSUPA or both. Alternatively, a base station 570a-570b may establish an air interface 590 with Evolved UTMS Terrestrial Radio Access (E-UTRA) using LTE, LTE-A, and/or LTE-B. It is contemplated that the communication system 500 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 520a-520b are in communication with the core network 530 to provide the EDs 510a-510c with various services such as voice, data, and other services. The RANs 520a-520b and/or the core network 530 may be in direct or indirect communication with one or more other RANs (not shown), which may or may not be directly served by core network 530, and may or may not employ the same radio access technology as RAN 520a, RAN 520b or both. The core network 530 may also serve as a gateway access between (i) the RANs 520a-520b or EDs 510a-510c or both, and (ii) other networks (such as the PSTN 540, the internet 550, and the other networks 560). In addition, some or all of the EDs 510a-510c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 550. PSTN 540 may include circuit switched telephone networks for providing plain old telephone service (POTS). Internet 550 may include a network of computers and subnets (intranets) or both, and incorporate protocols, such as IP, TCP, UDP. EDs 510*a*-510*c* may be multimode devices capable of operation according to multiple radio access technologies, and incorporate multiple transceivers necessary to support such radio access technologies.

Figure 6A:
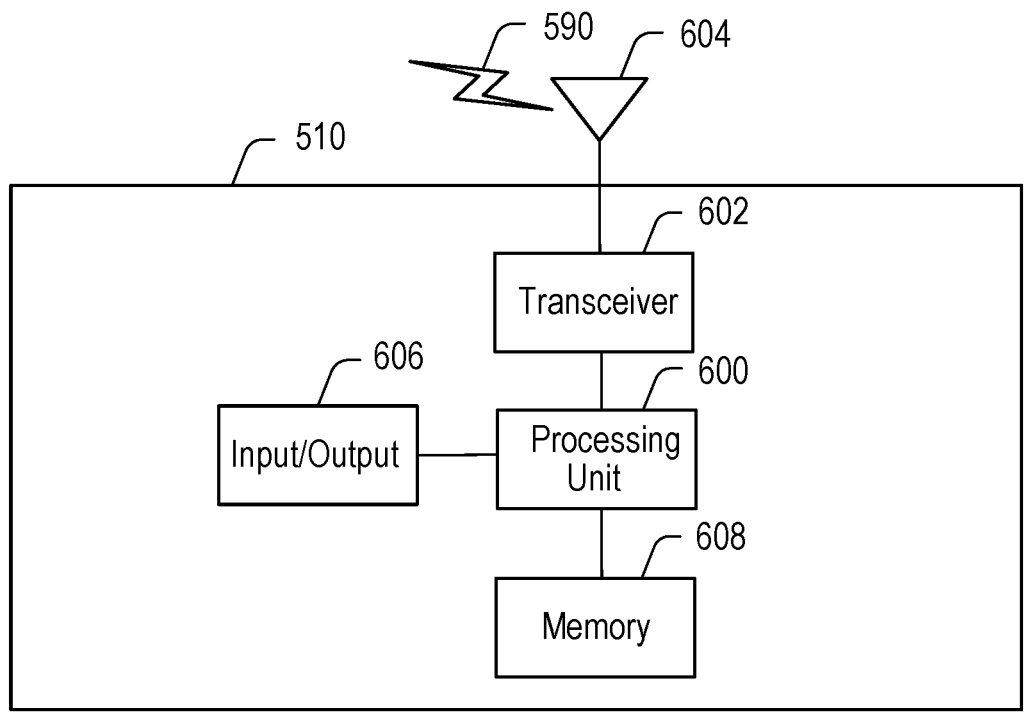
FIG. 6A is a block diagram of an example electronic device.
Figure 6B:
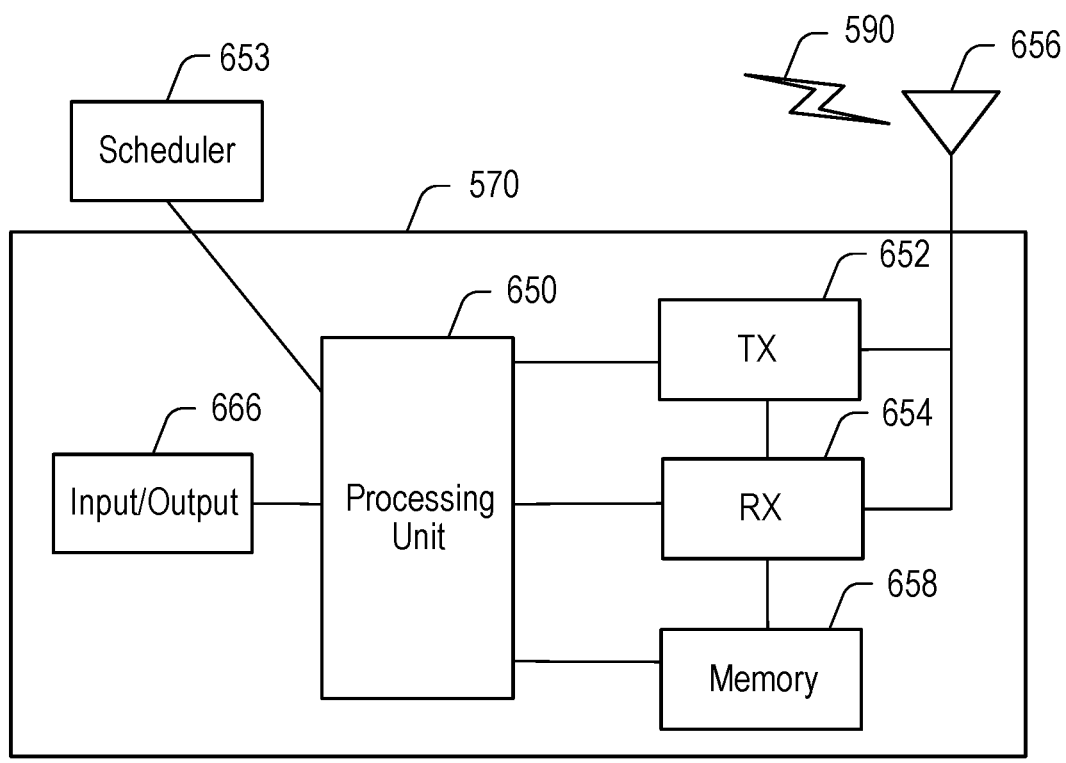
FIG. 6B is a block diagram of an example base station.

FIGS. 6A and 6B illustrate example devices that may implement the methods and teachings according to this disclosure. In particular, FIG. 6A illustrates an example ED 510, and FIG. 6B illustrates an example base station 570. These components could be used in the communication system 500 or in any other suitable system.

As shown in FIG. 6A, the ED 510 includes at least one processing unit 600. The processing unit 600 implements various processing operations of the ED 510. For example, the processing unit 600 could perform signal coding, data processing, power control, input/output processing, or any other functionality enabling the ED 510 to operate in the communication system 500. The processing unit 600 may also be configured to implement some or all of the functionality and/or embodiments described in more detail herein. Each processing unit 600 includes any suitable processing or computing device configured to perform one or more operations. Each processing unit 600 could, for example, include a microprocessor, microcontroller, digital signal processor, field programmable gate array, or application specific integrated circuit.

The ED 510 also includes at least one transceiver 602. The transceiver 602 is configured to modulate data or other content for transmission by at least one antenna or Network Interface Controller (NIC) 604. The transceiver 602 is also configured to demodulate data or other content received by the at least one antenna 604. Each transceiver 602 includes any suitable structure for generating signals for wireless or wired transmission and/or processing signals received wirelessly or by wire. Each antenna 604 includes any suitable structure for transmitting and/or receiving wireless or wired signals. One or multiple transceivers 602 could be used in the ED 510. One or multiple antennas 604 could be used in the ED 510. Although shown as a single functional unit, a transceiver 602 could also be implemented using at least one transmitter and at least one separate receiver.

The ED 510 further includes one or more input/output devices 606 or interfaces (such as a wired interface to the internet 550 in FIG. 5). The input/output devices 606 permit interaction with a user or other devices in the network. Each input/output device 606 includes any suitable structure for providing information to or receiving information from a user, such as a speaker, microphone, keypad, keyboard, display, or touch screen, including network interface communications.

In addition, the ED 510 includes at least one memory 608. The memory 608 stores instructions and data used, generated, or collected by the ED 510. For example, the memory 608 could store software instructions or modules configured to implement some or all of the functionality and/or embodiments described above and that are executed by the processing unit(s) 600. Each memory 608 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 6B, the base station 570 includes at least one processing unit 650, at least one transmitter 652, at least one receiver 654, one or more antennas 656, at least one memory 658, and one or more input/output devices or interfaces 666. A transceiver, not shown, may be used instead of the transmitter 652 and receiver 654. A scheduler 653 may be coupled to the processing unit 650. The scheduler 653 may be included within or operated separately from the base station 570. The processing unit 650 implements various processing operations of the base station 570, such as signal coding, data processing, power control, input/output processing, or any other functionality. The processing unit 650 can also be configured to implement some or all of the functionality and/or embodiments described in more detail herein. Each processing unit 650 includes any suitable processing or computing device configured to perform one or more operations. Each processing unit 650 could, for example, include a microprocessor, microcontroller, digital signal processor, field programmable gate array, or application specific integrated circuit.

Each transmitter 652 includes any suitable structure for generating signals for wireless or wired transmission to one or more EDs or other devices. Each receiver 654 includes any suitable structure for processing signals received wirelessly or by wire from one or more EDs or other devices. Although shown as separate components, at least one transmitter 652 and at least one receiver 654 could be combined into a transceiver. Each antenna 656 includes any suitable structure for transmitting and/or receiving wireless or wired signals. Although a common antenna 656 is shown here as being coupled to both the transmitter 652 and the receiver 654, one or more antennas 656 could be coupled to the transmitter(s) 652, and one or more separate antennas 656 could be coupled to the receiver(s) 654. Each memory 658 includes any suitable volatile and/or non-volatile storage and retrieval device(s) such as those described above in connection to the ED 510 in FIG. 6A. The memory 658 stores instructions and data used, generated, or collected by the base station 570. For example, the memory 658 could store software instructions or modules configured to implement some or all of the functionality and/or embodiments described herein and that are executed by the processing unit(s) 650.

Each input/output device 666 permits interaction with a user or other devices in the network. Each input/output device 666 includes any suitable structure for providing information to or receiving/providing information from a user, including network interface communications.

Figure 7:
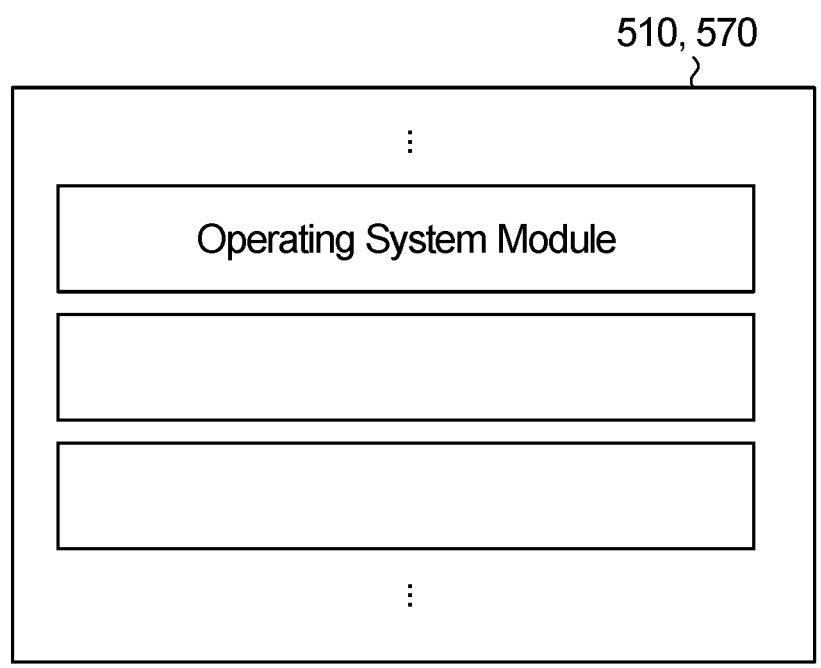
FIG. 7 is a block diagram of component modules.

It should be appreciated that one or more steps of the embodiment methods provided herein may be performed by corresponding units or modules, according to FIG. 7. For example, a signal may be transmitted by a transmitting unit or a transmitting module. A signal may be received by a receiving unit or a receiving module. A signal may be processed by a processing unit or a processing module. Other steps may be performed by an ML module. The respective units/modules may be implemented using hardware, one or more components or devices that execute software, or a combination thereof. For instance, one or more of the units/modules may be an integrated circuit, such as field programmable gate arrays (FPGAs) or application-specific integrated circuits (ASICs). It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs such as 510 and base stations such as 570 are known to those of skill in the art. As such, these details are omitted here.

In general, apparatus embodiments implementing methods as disclosed herein could take any of various forms. For example, in an embodiment, network equipment for a wireless communication network includes at least one antenna, a processor coupled to the at least one antenna, and a processor-readable memory coupled to the processor. The base station 570 is an example of such network equipment, with at least one antenna 656, a processor in the form of a processing unit 650, and a processor-readable memory 658 coupled to the processing unit.

The processor-readable memory stores processor-executable instructions which, when executed by the processor, cause the processor to perform a method as disclosed herein. An example of such a method is shown in FIG. 4, and involves receiving UE location information that is indicative of each of multiple UE locations in the wireless communication network from one or more UEs, determining for each location a respective antenna beam direction for communications between the network equipment and a UE at each location, and training an ML module using each location as an ML module input and the respective antenna beam direction for each location as an ML module output.

Features that are described elsewhere herein are also applicable to network equipment embodiments. For example, in an embodiment the instructions cause the processor to determine a respective antenna beam direction for each location by determining, for each location, one or both of a respective network equipment antenna beam direction and a respective UE antenna beam direction. For UE antenna beam direction determination, according to one possible option the instructions cause the processor to determine a respective antenna beam direction for each location by receiving a respective indication of the UE antenna beam direction for each location from a UE that is positioned at each location. For network equipment antenna beam determination, in some embodiments the instructions cause the processor to determine a respective antenna beam direction for each location by determining the respective network equipment antenna beam for each location based on beam scanning between the network equipment and a UE that is positioned at each location.

Instructions stored in memory at network equipment cause a network equipment processor to train, and optionally re-train, one or more ML modules. For re-training, for example, the instructions cause the processor to repeat training stage operations of receiving UE location information, determining beam directions, and training the ML module(s). Beam refinement is another optional feature that such instructions cause a network equipment processor to perform in some embodiments.

Network equipment could be configured to implement an ML module that includes a first ML module for network equipment beam predictions and a second ML module for UE beam predictions. In one such embodiment, the instructions stored at the network equipment cause the processor to train the ML module by training the first ML module using the UE locations as inputs and the respective network equipment antenna beam direction for each location as outputs, and training the second ML module using the UE locations as inputs and the respective UE antenna beam direction for each location as outputs.

For multi-path scenarios, in some embodiments the instructions cause the processor to determine a respective antenna beam direction for each location by determining, for each location, a respective set of multiple antenna beam directions for multi-path communications between the network equipment and a UE at each location, and the instructions also cause the processor to train the ML module using the UE locations as inputs and the respective sets of multiple antenna beam directions for each location as outputs.

In some multi-path embodiments, network equipment is configured to implement an ML module that includes a respective ML module to provide beam predictions for each path.

According to another embodiment, instructions stored at network equipment cause a network equipment processor to determine a respective antenna beam direction for each location by determining, for each location, a respective set of multiple antenna beam directions for multi-path communications between the network equipment and a UE at each location, and the ML module includes a first ML module for network equipment beam predictions and a second ML module for UE beam predictions. For training in one such multi-path, multi-ML module embodiment, the instructions cause the processor to train the ML module by training the first ML module using the UE locations as inputs and the respective sets of multiple network equipment antenna beam directions for each location as outputs, and training the second ML module using the UE locations as inputs and the respective sets of multiple UE antenna beam directions for each location as outputs.

Turning to beam prediction, the instructions stored at network equipment further cause a network equipment processor to receive from a UE an indication of a current location of the UE in the wireless communication network, and to obtain from the ML module, based on the current location of the UE, one or more antenna beam directions for communications between the network equipment and the UE at the current location.

For UE beam prediction, the instructions cause the processor to obtain an antenna beam direction by obtaining a UE antenna beam direction for communications between the network equipment and the UE at the current location, and the instructions further cause the processor to transmit to the UE an indication of the UE antenna beam direction obtained from the ML module. Such transmission to the UE is optional, and might not be performed, for example in embodiments in which instructions stored at network equipment cause a network equipment processor to obtain an antenna beam direction by obtaining only a network equipment antenna beam direction for communications between the network equipment and the UE at the current location. In other embodiments, instructions cause a network equipment processor to obtain an antenna beam direction by obtaining both a network equipment antenna beam direction and a UE antenna beam direction, and the instructions further cause the processor to transmit an indication of the UE beam direction to the UE.

Other network equipment embodiments are also possible.

For example, the description above focuses on network equipment. A wireless communication network will likely include multiple installations of network equipment. In an embodiment, a wireless communication network includes multiple base stations, with at least some of those base stations being implemented as, or at least including, network equipment as disclosed herein. Each installation of network equipment is provided for training a respective ML module for each base station, and for supporting ML-assisted beam prediction for communications between each base station and UEs at locations within the network.

Network equipment embodiments described above encompass both training and beam prediction. Considering beam prediction separately from training, in some embodiments instructions stored at network equipment cause a network equipment processor to perform a method that involves receiving from a UE an indication of a current location of the UE in the wireless communication network, and using the current location of the UE as an input to obtain from an ML module an antenna beam direction for communications between the network equipment and the UE at the current location. Based on the current location of the UE, one or more antenna beam directions for communications between the network equipment and the UE at the current location are obtained from the ML module. The UE location is input to the ML module, and the antenna beam direction(s) are then obtained from the ML module output(s). In this example, the ML module has been trained as disclosed herein, using each of multiple UE locations in the wireless communication network as an ML module input and a respective antenna beam direction for communications between the network equipment and a UE at each location as an ML module output.

In some embodiments, the instructions cause the processor to obtain a UE antenna beam direction for communications between the network equipment and the UE at the current location, and to transmit an indication of the UE antenna beam direction obtained from the ML module to the UE. This transmitting is optional. For example, in some embodiments the instructions cause the processor to obtain only a network equipment antenna beam direction for communications between the network equipment and the UE at the current location, and network equipment antenna beam direction need not be signaled to the UE. In other embodiments, the instructions cause the processor to obtain both a network equipment antenna beam direction and a UE antenna beam direction, and to transmit an indication of the UE beam direction to the UE.

Other embodiments may support fewer, additional, and/or different operations, and/or involve performing operations in any of various ways.

In some embodiments, the instructions cause the processor to obtain a network equipment antenna beam direction and a UE antenna beam direction, and the ML module includes multiple ML modules. For example, in an embodiment the instructions cause the processor to obtain the network equipment antenna beam direction from a first ML module, and to obtain the UE antenna beam direction from a second ML module.

Multi-path scenarios are also possible. In an embodiment, the instructions cause the processor to obtain a set of multiple antenna beam directions for multi-path communications between the network equipment and the UE at the current location.

Multiple ML modules are used in some multi-path embodiments. One example involves implementing a respective ML module to provide beam predictions for each path. In another embodiment, the instructions cause the processor to obtain a set of multiple network equipment antenna beam directions and a set of multiple UE antenna beam directions, and the ML module includes a first ML module for network equipment beam predictions and a second ML module for UE beam predictions. In this case, the instructions cause the processor to obtain the set of multiple network equipment antenna beam directions from the first ML module, and to obtain the set of multiple UE antenna beam directions from the second ML module.

Network equipment that supports ML-assisted beam prediction is implemented in multiple base stations of a wireless communication network in some embodiments. Each installation of network equipment is provided for obtaining, from a respective ML module at each base station, antenna beam directions for communications with each base station.

Method embodiments and network equipment embodiments represent illustrative example implementations of features disclosed herein. Such features could also or instead be implemented in the form of processor-executable instructions stored in a processor-readable memory. These processor-executable instructions, when executed by a processor in network equipment in a wireless communication network, cause the processor to perform a method.

In some embodiments, the method includes receiving, from User Equipment (UE), information indicative of each location of multiple UE locations in the wireless communication network; determining, for each location, a respective antenna beam direction for communications between the network equipment and a UE at each location; and training an ML module using each location as an ML module input and the respective antenna beam direction for each location as an ML module output.

According to another embodiment, the method includes receiving from a UE an indication of a current location of the UE in the wireless communication network; and using the current location of the UE as an input, to obtain an antenna beam direction for communications between the network equipment and the UE at the current location, from an ML module that has been trained using each of multiple UE locations in the wireless communication network as an ML module input and a respective antenna beam direction for communications between the network equipment and a UE at each location as an ML module output. Based on the current location of the UE, one or more antenna beam directions for communications between the network equipment and the UE at the current location are obtained from the ML module. The UE location is input to the ML module, and the antenna beam direction(s) are then obtained from the ML module output(s).

Features that are disclosed elsewhere herein are also applicable to methods that are implemented in the form of processor-executable instructions stored in processor-readable memory.

Additional detailed examples may aid in understanding aspects of the present disclosure. The examples below are based on uniform linear arrays of antenna elements at both a transmit (Tx or "t") side and a receive (Rx or "r") side, each with an angle of departure $\theta^{(t)}$ and angle of arrival $\theta^{(r)}$ for each path l. For a uniform linear array model, array beamforming coefficients for the transmit side and receive side are $$a_t(\theta_l^{(t)}) = \frac{1}{\sqrt{(M_t)}} \left[1, e^{-j\frac{2\pi d}{\lambda}\cos(\theta_l^{(t)})}, e^{-j\frac{2\pi \times 2d}{\lambda}\cos(\theta_l^{(t)})}, \ldots, e^{-j\frac{2\pi(M_t-1)d}{\lambda}\cos(\theta_l^{(t)})}\right]^T$$

$$a_r[\theta_l^{(r)}] = \frac{1}{\sqrt{(M_r)}} \left[1, e^{-j\frac{2\pi d}{\lambda}\cos(\theta_l^{(r)})}, e^{-j\frac{2\pi \times 2d}{\lambda}\cos(\theta_l^{(r)})}, \ldots, e^{-j\frac{2\pi(M_r-1)d}{\lambda}\cos(\theta_l^{(r)})}\right]^T$$

where $\lambda$ is wavelength, d is inter-array distance between adjacent antenna elements, and $M_t$ and $M_r$ are the numbers of antenna elements in the arrays at the transmit side and the receive side, respectively.

For each path l and corresponding path gain $\beta_l$, the equivalent channel matrix for analogue beamforming is $$H_l = a_r(\theta_l^{(r)}) \times \beta_l \times a_t^T(\theta_l^{(t)}).$$

After applying a transmit beamformer u and receive beamformer v, the received signal at time index n is $$r[n] = v^H \left( \sum_{l=0}^{L-1} H_l s[n-\tau_l] \right) u + v^H z[n]$$

where L is the total number of paths, $s[n-\tau_l]$ is the transmit symbol in path l that is delayed by time $\tau_l$ and $z[n]$ is the noise at time n.

The best beamformer pair, for the transmit side and the receive side, respectively, is $$(v^*, u^*) = \text{argmax}_{v \in V, u \in U} \left| v^H \left( \sum_{l=0}^{L-1} H_l s[n-\tau_l] \right) u + v^H z[n] \right|^2$$

where V and U are a transmit codebook and a receive codebook, respectively.

Ignoring path delay and noise, the optimal beam pair is $$(v^*, u^*) = \text{argmax}_{v \in V, u \in U} \left| v^H \left( \sum_{l=0}^{L-1} H_l \right) u \right|^2.$$

Assuming a quantized codebook for each of the transmit side and the receive side, the $i^{th}$ and $j^{th}$ codewords in the transmit-side and receive-side codebooks are $$u_i(\vartheta_i) = \frac{1}{\sqrt{M_t}} [1, e^{j\vartheta_i}, e^{-j2\vartheta_i}, \ldots, e^{-j(M_t-1)\vartheta_i}],$$

where $\vartheta_i \in \{\vartheta_0, \vartheta_1, \ldots, \vartheta_{|U-1|}\}$ $$v_j(\eta_j) = \frac{1}{\sqrt{M_r}} [1, e^{-j\eta_j}, e^{-j2\eta_j}, \ldots, e^{-j(M_r-1)\eta_j}],$$

where $\eta_j \in \{\eta_0, \eta_1, \ldots, \eta_{|V-1|}\}$ where each code in each codebook is characterized by an beam angle $\theta_i$ or $\eta_j$.

In this context, the beamforming problem is to find the best codebook index i and j from each codebook at the transmit side and the receive side. The optimal solution can be obtained by exhaustively searching the (i,j) beam index pair, as in a beam searching procedure.

Considering a single path (LOS) scenario in which there is only one beam predicted for a BS-UE pair, $$(v^*, u^*) = \text{argmax}_{v \in V, u \in U} \left| v^H \left( \sum_{l=0}^{L-1} H_l \right) u \right|^2 => (v^*, u^*) =$$

$$\text{argmax}_{v \in V, u \in U} |v^H H u|^2 => (v^*, u^*) =$$

$$\text{argmax}_{v \in V, u \in U} |v^H a_r(\theta^{(r)}) a_t^T(\theta^{(t)}) u|^2 => \begin{cases} v^* = \text{argmax}_{v \in V} |v^H a_r(\theta^{(r)}) u|^2 \\ u^* = \text{argmax}_{u \in U} |a_t^T(\theta^{(t)}) u|^2 \end{cases}$$

Figure 8:
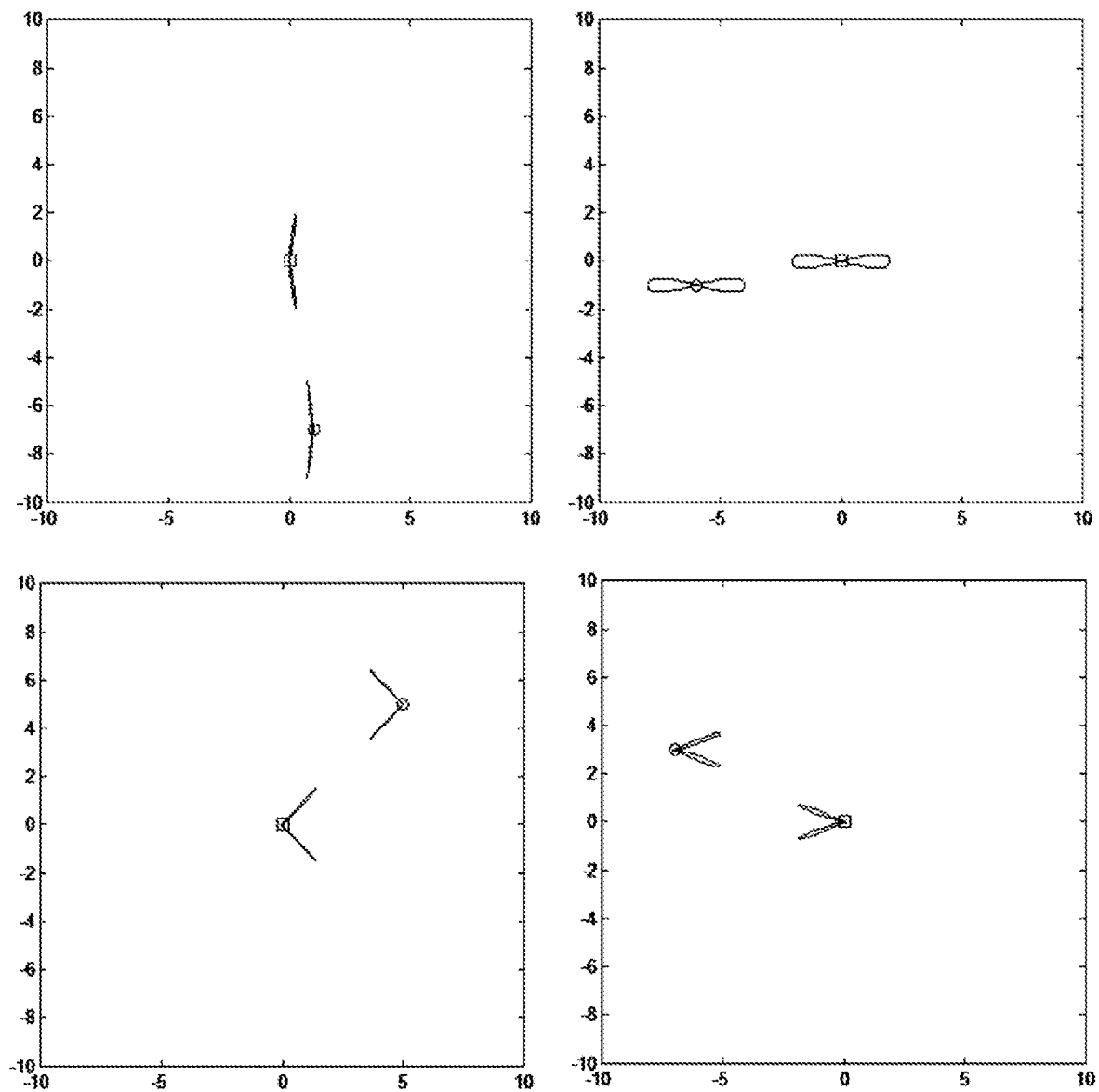
FIG. 8 includes plots that illustrate examples of optimal quantized transmit and receive beam patterns in an embodiment.

Four examples of the optimal quantized transmit and receive beam patterns $|v^H a_r(\theta^{(r)})|^2$ and $|a_t^T(\theta^{(t)}) u|^2$ are shown in FIG. 8. Only the most closely aligned beam patterns are shown.

For a single LOS beam and a neural network implementation for example, in an embodiment the input to a neural network is UE location, such as geographical coordinates (x,y) or (x,y,z), and the output of the neural network is a probability for each beam index. In such an embodiment, prediction could be considered a form of classification problem, by classifying beam indices into probability categories. A neural network could provide one or more outputs for either or both of BS-side beam prediction and UE-side beam prediction.

In simulations, training samples were generated from a baseline exhaustive scheme in Matlab software, and a tensorflow platform with Keras high-level Application Programming Interface (API) was used to implement a machine learning platform.

Simulation parameters for a network topology were as follows:

32-element uniform linear array at both BS side and UE side;

codebook size 32;

codebook angle uniformly distributed; and

BS at the center of a 200 m square, with no normalization with respect to distance because beam searching/training is location specific.

Simulation parameters for a neural network were set as follows:

2 layers;

number of neurons in each layer=2:256:32;

cross-entropy loss function was used;

activation function was Relu in the first 2 layers and softmax in the final output layer;

100000 UEs generated for training, and 50000 UEs generated for validation and testing—all supervised data, including UE location and optimal beam index, were generated by exhaustive search in Matlab assuming existence of only LOS links;

run 30 epochs with batch size 512.

These parameters are only examples. Other simulation conditions are possible, and actual operating conditions and/or results may vary.

Figure 9:
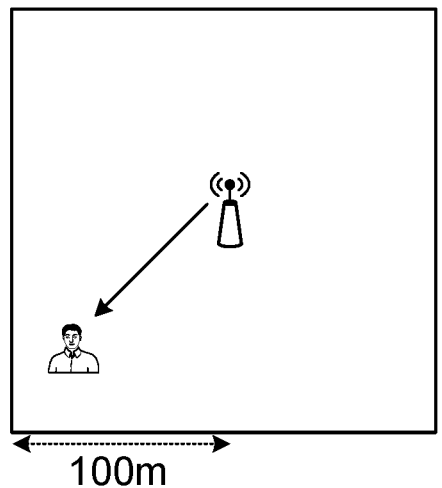
FIG. 9 is a plot illustrating an example simulation topology.
Figure 10:
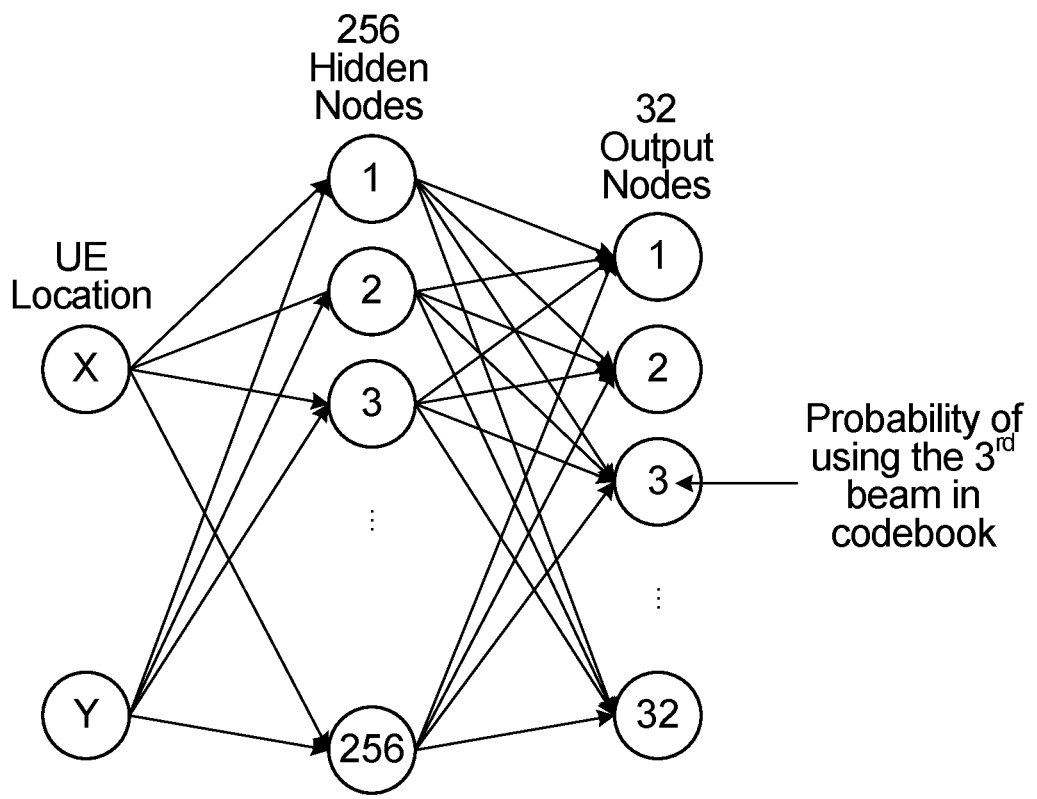
FIG. 10 is a block diagram illustrating an example neural network structure.

FIG. 9 is a plot illustrating the above example simulation topology, and FIG. 10 is a block diagram illustrating the above example neural network structure.

Figure 11:
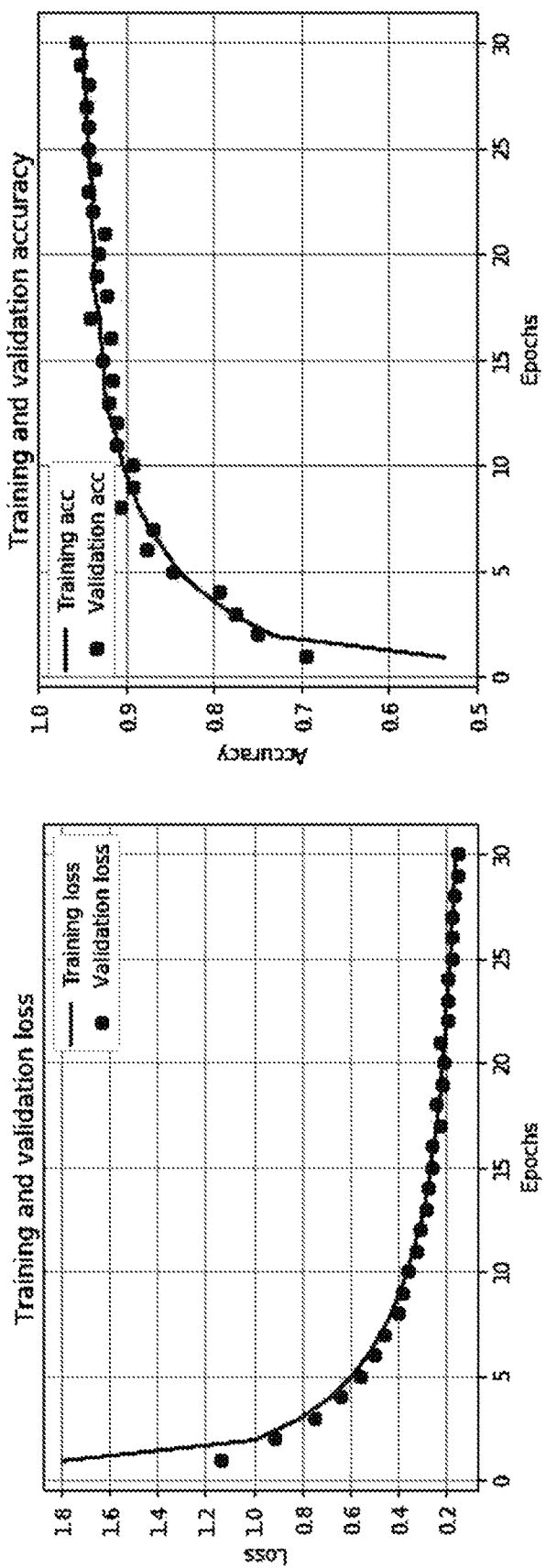
FIG. 11 includes two plots illustrating example simulation results.

The simulation results for BS-side beam prediction and UE-side beam prediction were similar, and therefore only BS-side beam prediction results are discussed herein. FIG. 11 includes two plots illustrating two metrics of convergence of the neural network. The two metrics are the cross-entropy loss function of training and validation on the left in FIG. 11, and accuracy (portion of correctly predicted beam index) of the training and validation on the right in FIG. 11. The training and validation loss plot in FIG. 11 shows near convergence after only 30 epochs, and the testing accuracy at this level of convergence is about 95.7%.

Figure 12:
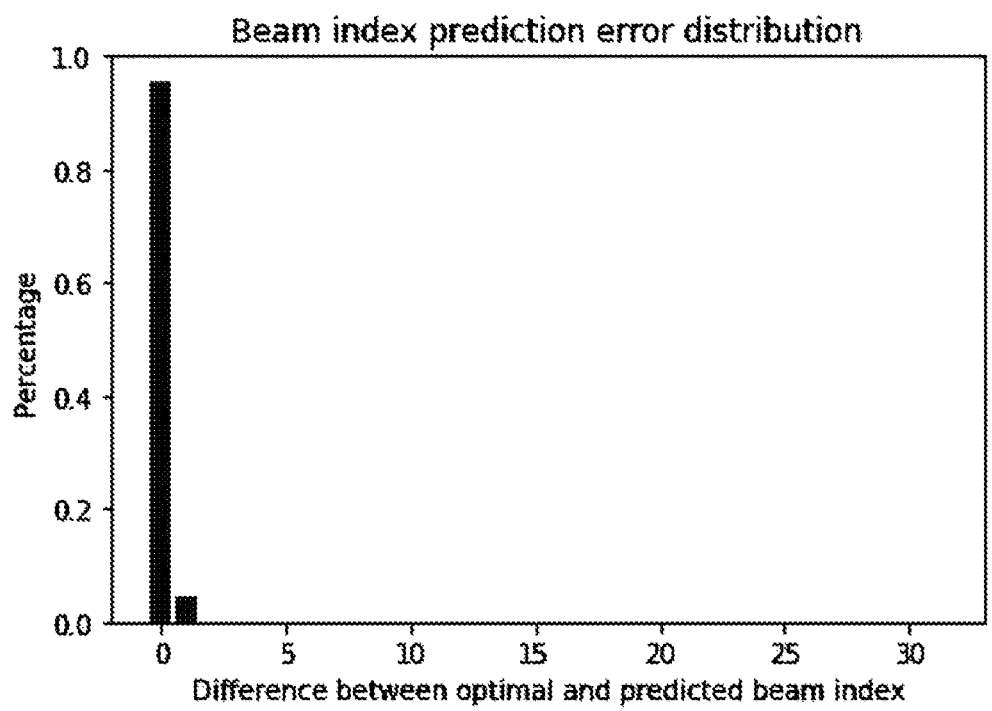
FIG. 12 is a plot of beam index prediction error distribution.

FIG. 12 is a plot of beam index prediction error distribution under the same example simulation conditions. Prediction error refers to the difference between an optimal beam index and a predicted beam index. 95.7% of predicted beam indices are correct as described above, and most of the remaining 4.3% of incorrectly predicted beam indices are a direct neighboring beam index (+1 or −1 index difference) of the optimal beam index. This indicates that incorrectly predicted beam indices can be corrected by running an additional round of beam refinement across just a predicted beam index and direct neighbor beam indices.

As another example, consider a multi-path (LOS+NLOS) scenario in which multiple beams are predicted for a BS-UE pair. The beam search is again modeled as $(v^*, u^*) = \arg\max_{v \in V, u \in U} |v^H(\Sigma_{l=0}^{L-1} H_l)u|^2$, where
$H_l = a_r(\theta_l^{(r)}) \times \beta_l \times a_t^T(\theta_l^{(o)})$.

Figure 13:
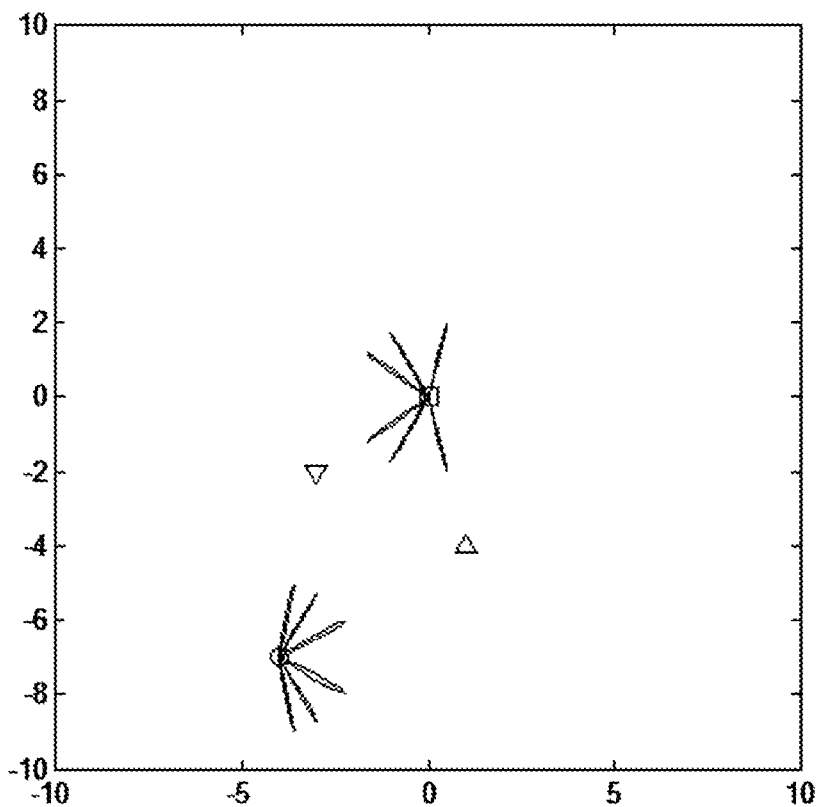
FIG. 13 is a block diagram illustrating an example multi-path topology.

In case the strongest path is blocked, more than one beam pair is trained and predicted, ranked by link strength $(v^*_1, u^*_1), (v^*_2, u^*_2), (v^*_3, u^*_3), \ldots$ A multi-path topology illustration is shown in FIG. 13, in which the two triangles represent signal reflectors.

For simulation of a multi-path scenario, the same neural network structure as in the above LOS scenario is adopted, but in a respective neural network for each of K strongest beam pairs. K neural networks are trained individually, and each one corresponds to one of the $1^{st}, 2^{nd}, \ldots, K^{th}$ strongest beam pairs. The $k^{th}$ strongest beam can be found by inputting UE location, such as UE coordinates, into the $k^{th}$ neural network. A single neural network is another option to predict all of the K strongest beams, but K separate neural networks are used in this example.

Figure 14:
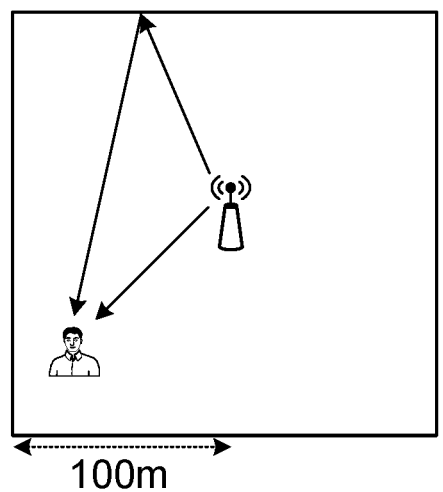
FIG. 14 is a plot illustrating an example multi-path simulation topology.

FIG. 14 is a plot illustrating an example multi-path simulation topology, with a BS located at the center of a 200 m by 200 m square. In FIG. 14, the top wall of the square area is a reflector, and generates one reflection. Therefore, in this example there are potentially two beams, for a direct (LOS) link and a reflection (NLOS) link from the top wall.

Most of the simulation parameters for this multi-path example are the same as for the above LOS example. However, for the multi-path example it is assumed that the path loss exponent of the LOS link is 2, whereas the path loss exponent of the NLOS link is 3. It is also assumed that the LOS path has a penetration loss of 20 dB, in order to manually weaken LOS signal; otherwise the NLOS signal was too weak compared to the LOS link to produce a meaningful multi-path simulation.

BS/UE beam pairs were determined by first ranking beam pairs by energy $(v^*, u^*) = \arg\max_{v \in V, u \in U} |v^H(\Sigma_{l=0}^{L-1} H_l)u|^2$. The strongest beam is the $1^{st}$ beam, and the $2^{nd}$ beam was chosen in order according to two other assumptions. First, it was assumed that the $2^{nd}$ best beam index differed from the best beam index by at least 3. This assumption was made because beam prediction via a neural network can be followed by beam refinement around neighboring beams as described above for the LOS example, and therefore beam prediction of the $2^{nd}$ best beam need not include a neighbor of the $1^{st}$ predicted beam. Second, if the energy of the $2^{nd}$ beam is too low compared to $1^{st}$ beam, it was assumed that only one beam is found. The threshold for this single-beam determination was set to 26 dB. If only one beam is found for a UE location, then the $2^{nd}$ beam index is set to be the same as the $1^{st}$ beam index.

In this multi-path example, two neural networks were trained separately, and include one neural network corresponding to the LOS link and another neural network corresponding to the NLOS link. The number of epochs is the same as in the LOS example above, but with a more complex neural network model compared to the LOS example. The multi-path neural networks are each 4 layers instead of the 2 layers in the LOS example, and the number of neurons in each layers is 2:256:256:256:32. All other neural network parameters are the same as in the LOS example.

Figure 15:
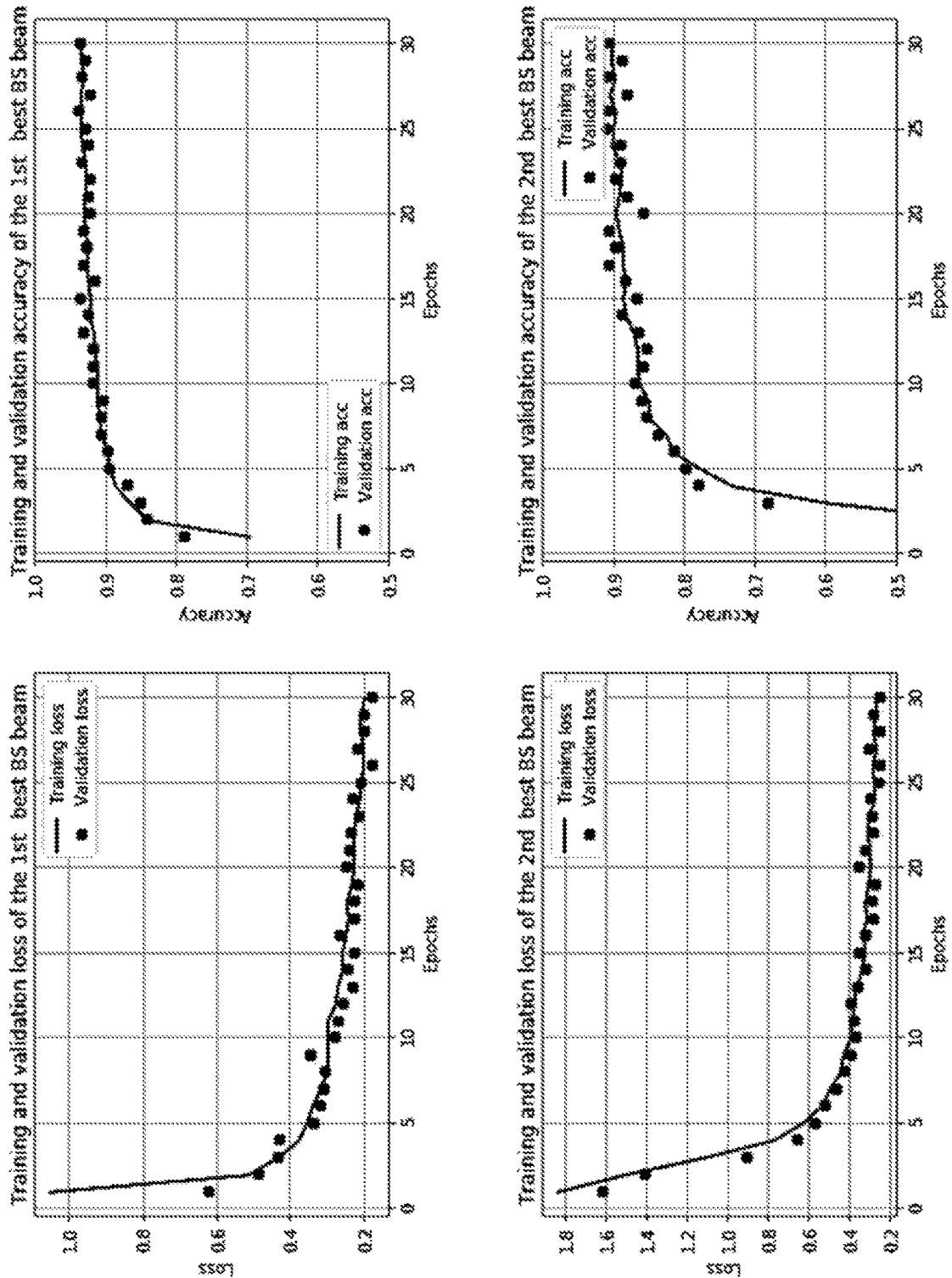
FIG. 15 includes two plots illustrating example simulation results for each of two neural networks.
Figure 16:
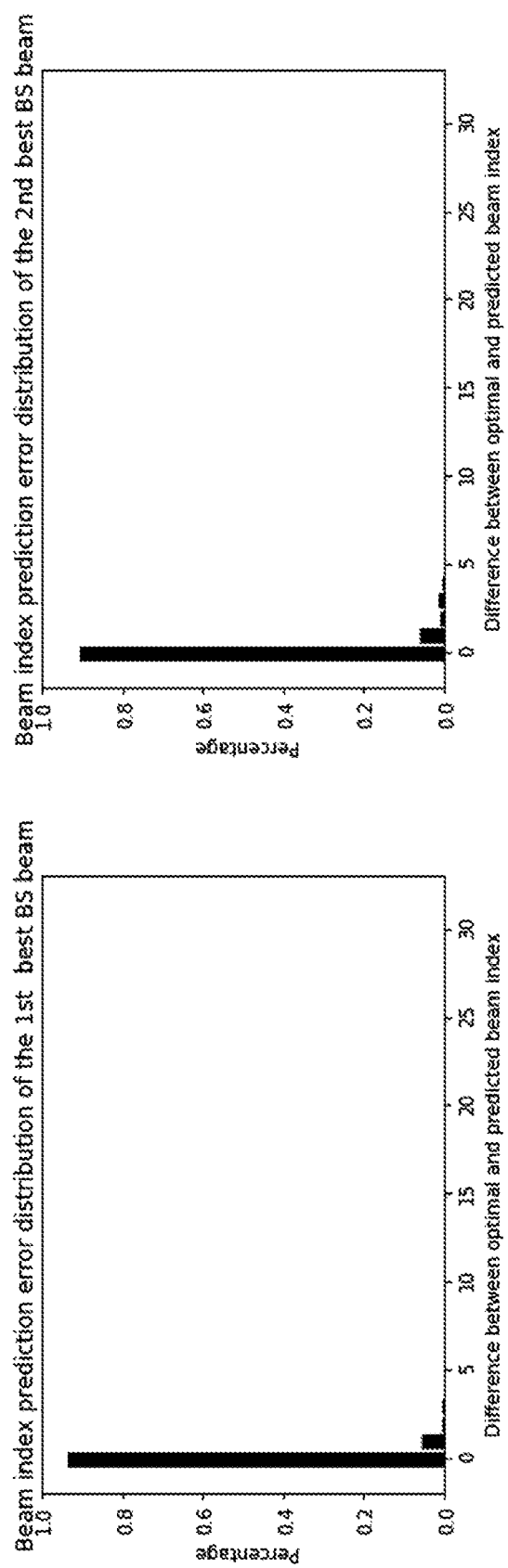
FIG. 16 includes a plot of beam index prediction error distribution for each of two neural networks.

Training and validation loss and accuracy for each of the two neural networks for the multi-path example are shown in the plots of FIG. 15, and beam index prediction error distribution for each of two neural networks is shown in FIG. 16.

FIG. 15 shows near convergence for the $1^{st}$ and $2^{nd}$ beam neural networks after 30 epochs, and prediction accuracy for the $1^{st}$ and $2^{nd}$ beams at 93.7% and 90.7%, respectively. From FIG. 16, it is evident that the remaining incorrectly determined beam indices for the $1^{st}$ and $2^{nd}$ beams (6.3% and 9.3%) are primarily neighboring beam indices (−3 to +3 index difference) of the optimal beams. With an additional round of beam refinement across just these neighboring beams, these errors can be corrected.

The simulation results presented above, for both the LOS example and the multi-path example, demonstrate that beam direction prediction based on neural networks can be very accurate, but prediction error may still exist. It is also shown that wrongly predicted beams are primarily neighbors (in terms of direction or index) of actual optimal beams, and therefore an optional additional round of beam refinement around just a predicted beam and its neighbors could be effective to correct prediction errors. With such small differences between optimal beam index and incorrectly predicted beam index, additional beam refinement does not incur nearly as much overhead as a full beam search. In this sense, a neural network based solution, or more generally ML-assisted beam prediction, can help at least in narrowing the selection of candidate beams for further refinement relative to conventional beam searching.

Numerous modifications and variations of the present disclosure are possible in light of the above teachings. It is therefore to be understood that within the scope of the appended claims, the disclosure may be practiced otherwise than as specifically described herein.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

Although this disclosure refers to illustrative embodiments, the disclosure is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as processor-executable or computer-executable instructions stored on a non-transitory processor-readable or computer-readable medium, for example. Such media could store programming or instructions to perform any of various methods consistent with the present disclosure.

Moreover, any module, component, or device exemplified herein that executes instructions may include or otherwise have access to a non-transitory computer-/processor-readable storage medium or media for storage of information, such as computer-/processor-readable instructions, data structures, program modules, and/or other data. A non-exhaustive list of examples of non-transitory computer-/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer-/processor-readable storage media may be part of a device or accessible or connectable thereto. Any application or module herein described may be implemented using computer-/processor-readable/executable instructions that may be stored or otherwise held by such non-transitory computer-/processor-readable storage media.

The invention claimed is:

1. A method performed by network equipment in a wireless communication network, the method comprising:
  receiving from a User Equipment (UE) an indication of a current location of the UE in the wireless communication network;
  obtaining, based on the current location of the UE as an input to a Machine Learning (ML) module that has been trained using each location of a plurality of UE locations in the wireless communication network as an ML module input and a respective antenna beam direction for communications between the network equipment and a UE at each location as an ML module output, an antenna beam direction for communications between the network equipment and the UE at the current location,
  wherein the obtaining comprises obtaining a network equipment antenna beam direction and a UE antenna beam direction,
  wherein the ML module comprises a first ML module and a second ML module, and
  wherein the obtaining comprises:
  obtaining, from the first ML module, the network equipment antenna beam direction; and
  obtaining, from the second ML module, the UE antenna beam direction.

2. The method of claim 1,
  wherein the obtaining an antenna beam direction for communications between the network equipment and the UE at the current location comprises obtaining: a set of multiple antenna beam directions for multi-path communications between the network equipment and the UE.

3. The method of claim 2,
  wherein the obtaining a set of multiple antenna beam directions for multi-path communications comprises:
  obtaining, from the first ML module, a set of multiple network equipment antenna beam directions; and
  obtaining, from the second ML module, a set of multiple UE antenna beam directions.

4. The method of claim 1, further comprising:
  transmitting to the UE an indication of the UE antenna beam direction.

5. The method of claim 1, further comprising:
  re-training the ML module.

6. The method of claim 1, wherein the ML module comprises a neural network.

7. Network equipment for a wireless communication network, the network equipment comprising:
  at least one antenna;
  a processor coupled to the at least one antenna; and
  a processor-readable memory, coupled to the processor, and storing processor-executable instructions which, when executed by the processor, cause the processor to perform a method comprising:
    receiving from a User Equipment (UE) an indication of a current location of the UE in the wireless communication network;
    obtaining, based on the current location of the UE as an input to a Machine Learning (ML) module that has been trained using each location of a plurality of UE locations in the wireless communication network as an ML module input and a respective antenna beam direction for communications between the network equipment and a UE at each location as an ML module output, an antenna beam direction for communications between the network equipment and the UE at the current location,
  wherein the obtaining comprises obtaining a network equipment antenna beam direction and a UE antenna beam direction,
  wherein the ML module comprises a first ML module and a second ML module, and
  wherein the instructions cause the processor to obtain the network equipment antenna beam direction from the first ML module, and to obtain the UE antenna beam direction from the second ML module.

8. The network equipment of claim 7,
  wherein the instructions cause the processor to obtain the antenna beam direction for communications between the network equipment and the UE at the current location by obtaining a set of multiple antenna beam directions for multi-path communications between the network equipment and the UE.

9. The network equipment of claim 8, wherein the instructions cause the processor to obtain the set of multiple antenna beam directions for multi-path communications by obtaining a set of multiple network equipment antenna beam directions from the first ML module, and obtaining a set of multiple UE antenna beam directions from the second ML module.

10. The network equipment of claim 7, wherein the instructions further cause the processor to:
transmit to the UE an indication of the UE antenna beam direction.

11. The network equipment of claim 7, wherein the instructions further cause the processor to re-train the ML module.

12. The network equipment of claim 7, wherein the ML module comprises a neural network.

13. A wireless communication network comprising a plurality of base stations, each base station of the plurality of base stations comprising the network equipment of claim 7 for obtaining, from a respective ML module at each base station, antenna beam directions for communications with each base station.

14. The processor-readable memory storing processor-executable instructions which, when executed by a processor in network equipment in a wireless communication network, cause the processor to perform a method comprising:
receiving from a User Equipment (UE) an indication of a current location of the UE in the wireless communication network;
obtaining based on the current location of the UE as an input to a Machine Learning (ML) module that has been trained using each location of a plurality of UE locations in the wireless communication network as an ML module input and a respective antenna beam direction for communications between the network equipment and a UE at each location as an ML module output, an antenna beam direction for communications between the network equipment and the UE at the current location,
wherein the obtaining comprises obtaining a network equipment antenna beam direction and a UE antenna beam direction,
wherein the ML module comprises a first ML module and a second ML module, and
wherein the instructions cause the processor to obtain the network equipment antenna beam direction from the first ML module, and to obtain the UE antenna beam direction from the second ML module.

15. The processor-readable memory claim 14, wherein the instructions cause the processor to obtain the antenna beam direction for communications between the network equipment and the UE at the current location by obtaining a set of multiple antenna beam directions for multi-path communications between the network equipment and the UE.

16. The processor-readable memory of claim 15, wherein the instructions cause the processor to obtain the set of multiple antenna beam directions for multi-path communications by obtaining a set of multiple network equipment antenna beam directions from the first ML module, and obtaining a set of multiple UE antenna beam directions from the second ML module.

17. The processor-readable memory of claim 14, wherein the instructions further cause the processor to:
transmit to the UE an indication of the UE antenna beam direction.

18. The processor-readable memory of claim 14, wherein the instructions further cause the processor to re-train the ML module.

19. The processor-readable memory of claim 14, wherein the ML module comprises a neural network.

* * * * *